(12) United States Patent
Horigome et al.

(10) Patent No.: US 8,514,680 B2
(45) Date of Patent: Aug. 20, 2013

(54) RECORDING DEVICE AND SPOT POSITION CONTROL METHOD

(75) Inventors: Junichi Horigome, Tokyo (JP); Yoshihiko Deoka, Tokyo (JP)

(73) Assignee: Sony Corporation, Tokyo (JP)

( * ) Notice: Subject to any disclaimer, the term of this patent is extended or adjusted under 35 U.S.C. 154(b) by 68 days.

(21) Appl. No.: 13/276,506

(22) Filed: Oct. 19, 2011

(65) Prior Publication Data

US 2012/0099409 A1    Apr. 26, 2012

(30) Foreign Application Priority Data

Oct. 26, 2010    (JP) ................................ 2010-239472

(51) Int. Cl.
*G11B 7/00* (2006.01)
(52) U.S. Cl.
USPC ........ 369/53.23; 369/53.28; 369/94; 369/103
(58) Field of Classification Search
USPC .................. 369/44.32, 53.23, 53.28, 94, 283, 369/103
See application file for complete search history.

(56) References Cited

U.S. PATENT DOCUMENTS

| | | | | |
|---|---|---|---|---|
| 4,933,925 A | * | 6/1990 | Yamaguchi et al. | 369/44.27 |
| 6,069,869 A | * | 5/2000 | Nagasawa et al. | 369/275.3 |
| 6,320,839 B1 | * | 11/2001 | Tobita et al. | 369/275.4 |
| 2003/0016600 A1 | * | 1/2003 | Hiratsuka | 369/44.34 |
| 2007/0230292 A1 | * | 10/2007 | Yamamoto et al. | 369/44.26 |
| 2008/0186840 A1 | | 8/2008 | Uchiyama et al. | |
| 2008/0205257 A1 | * | 8/2008 | Yamatsu et al. | 369/284 |
| 2009/0067313 A1 | * | 3/2009 | Shiono et al. | 369/112.01 |
| 2010/0309759 A1 | * | 12/2010 | Sato et al. | 369/44.26 |
| 2011/0103211 A1 | * | 5/2011 | Fujita et al. | 369/100 |

FOREIGN PATENT DOCUMENTS

| | | |
|---|---|---|
| JP | 2008-135144 A | 6/2008 |
| JP | 2008-176902 A | 7/2008 |

* cited by examiner

*Primary Examiner* — Thomas Alunkal
(74) *Attorney, Agent, or Firm* — Wolf, Greenfield & Sacks, P.C.

(57) ABSTRACT

A recording device including a light irradiating and light receiving unit which, in regard to an optical recording medium, which has a reference surface and a recording layer which is formed at a depth position different from the reference surface, where a pit row where intervals of pit formable positions in one circumference is limited to a first interval is formed in the reference surface, and which has a plurality of pit row phases by intervals of the pit formable positions in a pit row formation direction being set in a position which is each deviated by a predetermined second interval in the pit row which are arranged in the radial direction, irradiates a first light as recording light with regard to the recording layer and a second light for obtaining reflected light from the reference surface and which receives reflected light of the second light from the reference surface.

6 Claims, 25 Drawing Sheets

RECORDING DEVICE AND SPOT POSITION CONTROL METHOD

BACKGROUND

The present disclosure relates to a recording device and a method thereof which performs recording with regard to an optical recording medium which has a reference surface, where a position guidance element is formed, and a recording layer, which is formed at a depth position different from the reference surface.

As an optical recording medium which performs recording and reproduction of a signal using the irradiation of light, for example, so-called optical discs such as a CD (Compact Disc), a DVD (Digital Versatile Disc), and a BD (Blu-ray Disc: registered trademark) are in wide-spread use.

In the present state of CDs, DVDs and BDs, in relation to the optical recording media which are to be the next generation of optical recording media in wide-spread use, the present applicants have previously proposed a so-called bulk recording type (also simply referred to as bulk type) of optical recording media such as that disclosed in Japanese Unexamined Patent Application Publication No. 2008-135144 and Japanese Unexamined Patent Application Publication No. 2008-179902.

Here, bulk recording is a technique where a large recording capacity is achieved by changing a sequential focus position, performing laser light irradiation, and performing multi-layer recording in a bulk layer 102 in regard to, for example, an optical recording medium (a bulk recording medium 100) which has at least a cover layer 101 and a bulk layer (recording layer) 102 as shown in FIG. 23.

In relation to bulk recording such as this, in Japanese Unexamined Patent Application Publication No. 2008-135144, a recording technique is disclosed which is called a so-called micro-hologram format. In the micro-hologram format, a so-called hologram recording material is used as the recording material of the bulk layer 102. As the hologram recording material, for example, light-cured photopolymer and the like are widely known.

The micro-hologram format is largely divided into a positive-type micro-hologram format and a negative-type micro-hologram format.

The positive-type micro-hologram format is a method where a detailed hologram is formed by two opposing light beams (light beam A and light beam B) focusing on the same position and this becomes a recording mark.

In addition, the negative-type micro-hologram format is a method where a hologram formed in advance is removed using laser light irradiation and the removed portion is a recording mark and is a concept which is the opposite of the positive-type micro-hologram format. In the negative-type micro-hologram format, as an initialization process, a process where holograms are formed in advance in the bulk layer is necessary.

In addition, as a method of bulk recording which is different from the micro-hologram format, the present applicants also proposed a recording method where a void (blank or hole) is formed as a recording mark such as that disclosed in Japanese Unexamined Patent Application Publication No. 2008-179902.

The void recording method is a method where a blank is recorded in the bulk layer 102 described above by laser light irradiation being performed at a comparatively high power with regard to the bulk layer 102 which is configured, for example, by a recording material such as a light-cured photopolymer. As is described in Japanese Unexamined Patent Application Publication No. 2008-179902, the blank portion formed in this manner is a portion with a different refractive index than another portion in the bulk layer 102 and the reflectivity of light is increased at the boundary portion of these portions. Accordingly, the blank portion described above functions as a recording mark and information recording is realized using the forming of the blank marks in this manner.

In such a void recording method, it is possible for it to be sufficient that light irradiation is performed from one side in the recording since holograms are not formed. That is, it is possible that it is not necessary to form a recording mark by focusing two light beams on the same position as in the case of the positive-type micro-hologram format described above.

In addition, in the comparison with a negative-type micro-hologram format, there is a merit that it is possible that an initialization process is not necessary.

Here, in Japanese Unexamined Patent Application Publication No. 2008-179902, an example is shown where irradiation of precuring light is performed before recording in the performing of void recording, but void recording, where the irradiation of precuring light is omitted, is possible.

However, there are bulk recording types (also simply referred to as bulk types) of optical recording media where various types of recording methods are proposed such as that described above, but the recording layer (bulk layer) of the bulk type of optical recording media in this manner does not have an explicit multi-layer structure with the meaning of a plurality of position guidance elements and recording films (reflecting films), where the position guidance elements are formed, being formed. That is, in regard to this point, it is possible to omit the manufacturing process of the plurality of recording films (and the position guidance elements) which are necessary in a case of a normal multi-layer disc, and to that extent, it is possible to achieve a reduction in manufacturing cost.

However, with the previous configuration of the bulk recording medium 100 shown in FIG. 23 as it is, it is not possible to perform a focus servo or a tracking servo when recording without out forming marks.

As a result, in regard to the bulk recording medium 100, a reflecting surface as a reference which has a position guidance element is provided as shown in FIG. 24.

Specifically, a guidance groove (position guidance element) using, for example, formation of a pit or groove is formed in a spiral shape or in a concentric shape in the lower surface side of the cover layer 101, and a selective reflecting film 103 is deposited thereon. Then, with regard to the lower surface side of the cover layer 102 where the selective reflecting film 103 is deposited in this manner, the bulk layer 102 is laminated via, for example, an adhesive material such as a UV curing resin as an intermediate layer 104 in the diagram.

Here, recording of absolute position information (address information) such as radial position information, rotation angle information, and the like is performed using the formation of the guidance groove using a pit, a groove, or the like such as that described above. In the description below, a surface (formation surface of the selective reflecting film 103 in this case), where the recording of absolute position information is performed with the guidance groove formed in this manner, is referred to as a "reference surface Ref".

In addition, with a medium configuration such as that described above, with regard to the bulk recording medium 100, separately to the laser light (also referred to as laser light for recording and reproduction or simply as recording and reproduction light) for recording (and reproduction) of the marks such as those shown in FIG. 25, laser light for servos (also simply referred to as servo light) is irradiated as laser light for position control.

As shown in the diagram, the laser light for recording and reproduction and the laser light for servos are irradiated onto the bulk recording medium 100 via a common object lens.

At this time, assuming that the laser light for servos reaches the bulk layer 102, there is a concern that a negative influence may be applied to the mark recording in the bulk layer 102. As a result, in the bulk recording methods in the past, with laser light with a different wavelength range from the laser light for recording and reproduction being used as the laser light for servos, the selective reflecting film 103, which has wavelength selectivity where the laser light for servos is reflected and the laser light for recording and reproduction is transmitted, is provided as the reflective layer formed in the reference surface Ref.

With the assumptions above taken into consideration, an operation when mark recording with regard to the bulk recording medium 100 will be described with reference to FIG. 25.

First, when multi-layer recording is performed with regard to the bulk layer 102 where a guidance groove or a reflective film is not formed, the positioning of a layer position where a mark is recorded is set in advance in the depth direction in the bulk layer 102. In the diagram, a case is shown where a total of five information recording layer positions L of a first information recording layer position L1 to a fifth information recording layer position L5 are set as the layer position (mark formation layer position: also called information recording layer position) where a mark is formed in the bulk layer 102. As shown in the diagram, the first information recording layer position L1 is set as a position which is separated from the selective reflecting film 103 (reference surface Ref) where the guidance groove is formed in a focus direction (depth direction) by an amount of a first offset of-L1. In addition, the second information recording layer position L2, the third information recording layer position L3, the fourth information recording layer position L4, and the fifth information recording layer position L5 are set as positions which are separated from the reference surface Ref respectively by a second offset of-L2, a third offset of-L3, a fourth offset of-L4, and a fifth offset of-L5.

Here, the number of layer positions L is not to be limited to five.

When recording with the marks not being formed, it is not possible to perform a focus servo and a tracking servo with each layer position in the bulk layer 102 as a target based on reflected light of the laser light for recording and reproduction. Accordingly, focus servo control and tracking servo control of the object lens when recording is performed so that the spot position of the laser light for servos tracks the guidance groove in the reference surface Ref based on reflected light of the laser light for servos.

However, it is necessary for the laser light for recording and reproduction described above to reach the bulk layer 102 formed more to a lower layer side than the reference surface Ref in order to perform mark recording. As a result, in an optical system in this case, separately to a focus mechanism of the object lens, a focus mechanism (focus mechanism for recording and reproduction light) is separately provided for independently setting up and adjusting a focus position of the laser light for recording and reproduction.

Specifically, as a focus mechanism such as this, an expander is provided which changes the collimation state (divergence/parallel/convergence) of the laser light for recording and reproduction which is irradiated into the object lens. That is, by changing the collimation state of the laser light for recording and reproduction which is irradiated into the object lens in this manner, it is possible for the focus position of the laser light for recording and reproduction to be adjusted independently from the laser light for servos.

By providing the focus mechanism with regard to the laser light for recording and reproduction in this manner, using the performing of the focus and tracking servo control of the object lens described above based on the reflected light of the laser light for servos from the reference surface Ref, the focus position of the laser light for recording and reproduction is matched with the predetermined information recording layer positions L in the bulk layer 102 and is controlled to be a position which corresponds to the guidance groove formed in the reference surface Ref in a tracking direction.

Here, when reproduction is performed with regard to the bulk recording medium 100 where mark recording has already been performed, there is no necessity for the position of the object lens to be controlled based on the reflected light of the laser light for servos as when recording. That is, when reproducing, it is sufficient if the focus and tracking servo control of the object lens is performed based on the reflected light of the laser light for recording and reproduction with a row of marks formed in the information recording layer positions L which are reproduction targets as a target (also referred to as information recording layer L when reproducing).

SUMMARY

When recording with regard to the bulk recording medium 100 as described above, the focus servo and the tracking servo of the object lens is performed based on the reflected light of the laser light for servos from the reference surface Ref, and by focusing the laser light for recording and reproduction on the predetermined information recording layer positions L in the bulk layer 102 using the focus mechanism described above, it is possible to perform mark recording at a predetermined position in the bulk layer 102.

Here, the laser light for servos and the laser light for recording and reproduction as described above uses laser light which respectively have different wavelength ranges in order to realize the selective reflection of the selective reflecting film 103. At this time, considering that the recording density of the bulk layer 102 is to be increased, the laser light for recording and reproduction is to be light with a shorter wavelength than the laser light for servos. For example, it is considered that the laser light for servos is set as red laser light (wavelength $\lambda$ is approximately 650 nm) in the same manner as a DVD and the laser light for recording and reproduction is set as blue laser light (wavelength $\lambda$ is approximately 405 nm) in the same manner as a BD.

However, using a position control method in the related art as described above, the recording pitch in the bulk layer 102 depends on the track pitch of the reference surface Ref. That is, the position guidance element is formed in a spiral shape (or a concentric shape) using a pit, a groove, or the like in the reference surface Ref, the recording pitch of the bulk layer 102 is the same as the formation pitch of the position guidance elements (track pitch), and ultimately, even if the spot size of the laser light for recording and reproduction is small, it is not possible to increase the recording density of the bulk layer 102 (in the radial direction) to be more than the recording density of the reference surface Ref.

It is desirable that, in a recording device which is configured, with regard to an optical recording medium which has a reference surface, where a position guidance element is formed, and a recording layer, which is formed at a depth position different from the reference surface, so that a first light as recording light with regard to the recording layer and a second light for obtaining reflected light from the reference surface are irradiated via a common object lens and that tracking servo control of the object lens is performed based on reflected light of the second light from the reference surface, the recording pitch of the recording layer does not depend on the track pitch of the reference surface. In addition, in this case, it is desirable that, in combination with this, stability of the tracking servo is more reliable.

According to an embodiment of the present disclosure, there is provided a recording device configured as below.

That is, this configuration includes, in regard to an optical recording medium which has a reference surface and a recording layer, which is formed at a depth position different from the reference surface, where a pit row where intervals of pit formable positions in one circumference is limited to a first interval are formed in a spiral shape or a concentric shape in the reference surface, and which has a plurality of pit row phases by intervals of the pit formable positions in a pit row formation direction being set in a position which is each deviated by a predetermined second interval in the pit row which are arranged in the radial direction, a light irradiating and light receiving unit is provided which via a common object lens irradiates a first light as recording light with regard to the recording layer and a second light for obtaining reflected light from the reference surface and which receives reflected light of the second light from the reference surface.

In addition, this configuration also includes a tracking mechanism unit is provided which changes the position of the object lens in the radial direction.

In addition, this configuration also includes a clock generating unit is provided which generates a clock in accordance with the interval of the pit formable positions based on the light reception signal obtained by the light irradiating and light receiving unit receiving reflected light of the second light.

In addition, this configuration also includes a timing selection signal generating unit is provided which generates a plurality of timing selection signals, which respectively represent timings of the pit formable positions in regard to the pit rows of each phase formed in the optical recording medium, based on the clock generated by the clock generating unit.

In addition, this configuration also includes a tracking error signal generating unit.

That is, this configuration also includes the tracking error signal generating unit is provided which is configured, when a pit row, which is selected to be a target of a tracking servo out of the pit rows of each phase formed in the reference surface, is a target pit row and an intermediate position, which is selected to be a target of a tracking servo out of the respective intermediate positions of the pit rows of each phase formed in the reference surface, is a target intermediate position, to be able to execute generation of a first tracking error signal which represents a positional error in the radial direction with regard to the target pit row in the irradiation spot position of the second light by selecting timing selection signals, which respectively correspond to two pit rows where the phase difference with regard to the target pit row each have the same relationship, from the plurality of timing selection signals as the timing selection signal for pit row selection, sampling and holding a value of the light reception signal in regard to the respective timings which represent the timing selection signals for pit row selection, and calculating a difference in the value which is sampled and held, and generation of a second tracking error signal which represents a positional error in the radial direction with regard to the target intermediate position in the irradiation spot position of the second light by selecting timing selection signals, which respectively correspond to two pit rows where the phase difference with regard to the target intermediate position each have the same relationship, from the plurality of timing selection signals as the timing selection signal for pit row in-between position selection, sampling and holding a value of the light reception signal in regard to the respective timings which represent the timing selection signals for pit row in-between position selection, and calculating a difference in the value which is sampled and held.

In addition, this configuration also includes a tracking servo control unit is provided which performs tracking servo control with regard to the object lens by controlling the tracking mechanism unit based on the tracking error signal output by the tracking error signal generating unit.

In addition, this configuration also includes an offset applying unit is provided which performs application of an offset using a saw-tooth wave with regard to a tracking servo loop which includes the tracking servo control unit.

Furthermore, this configuration also includes a control unit is provided which controls output using the tracking error signal generating unit so as to alternately switch between the first tracking error signal and the second tracking error signal at a timing in accordance with a polarity reversion timing of the offset using the saw-tooth wave.

According to a position control method of an embodiment of the disclosure where there is a combination of the configuration of the reference surface as described above and the tracking servo control method using the application of the offset using the saw-tooth wave and sequential switching (pit row/intermediate position) of the tracking error signal, it is possible to maintain a state where the tracking servo is applied and continuously change the position of the irradiation spot position of the second light (and further the irradiation spot position of the first light) in the radial direction. At this time, it is possible to arbitrarily set the amount of movement of the irradiation spot position in the radial direction for each unit of time by setting the inclination of the offset. As a result, according to the embodiment of the disclosure, a spiral using an arbitrary pitch is able to be traced as a movement trace of the spot.

As will be made clear, according to the embodiment of the disclosure, it is possible that the recording pitch in the recording layer does not depend on a track pitch in the reference surface.

Then, in the embodiment of the disclosure, not only the first tracking error signal for selecting the pit row but also the second tracking error signal for selecting the intermediate position between the pit rows is used in the position control using offset application and switching of the tracking error signal (switching of servo target positions).

According to the embodiment of the disclosure where position control also uses the second tracking error signal in this manner, it is possible to perform selection of the servo target position in smaller intervals, and to this extent, it is possible for a largest value (absolute value) of the offset of the saw-tooth wave for changing the position of the irradiation spot position as described above in the radial direction to be suppressed to be smaller. In other words, it is possible for a largest value of separation from a target value (zero) of the tracking error signal to be suppressed to be smaller, and due to this, it is possible to realize position control which uses a portion with greater linearity in the tracking error signal, and as a result, it is possible further improve the stability of the servo control.

According to the embodiment of the disclosure as described above, in a recording device which is configured, with regard to an optical recording medium which has a reference surface, where a position guidance element is formed, and a recording layer, which is formed at a depth position different from the reference surface, so that a first light as recording light with regard to the recording layer and a second light for obtaining reflected light from the reference surface are irradiated via a common object lens and that tracking servo control of the object lens is performed based on reflected light of the second light from the reference surface, it is possible that the recording pitch of the recording layer does not depend on the track pitch of the reference surface. That is, due to this, it is possible that the recording pitch of the recording layer is smaller than in the related art, and as a result, it is possible further improve the recording density.

Furthermore, according to the embodiment of the disclosure, since the first tracking error signal for selecting the pit row as the servo target and the second tracking error signal for selecting the intermediate position between the pit rows as the servo target are used in performing of the continuously changing of the position of the spot position in the radial direction using the offset application to the servo loop and sequential switching of the tracking error signal, it is possible for a largest value (absolute value) of the offset to be applied in position control to be smaller, and as a result, it is possible further improve the stability of the servo control.

DETAILED DESCRIPTION OF EMBODIMENTS

Figure 1:
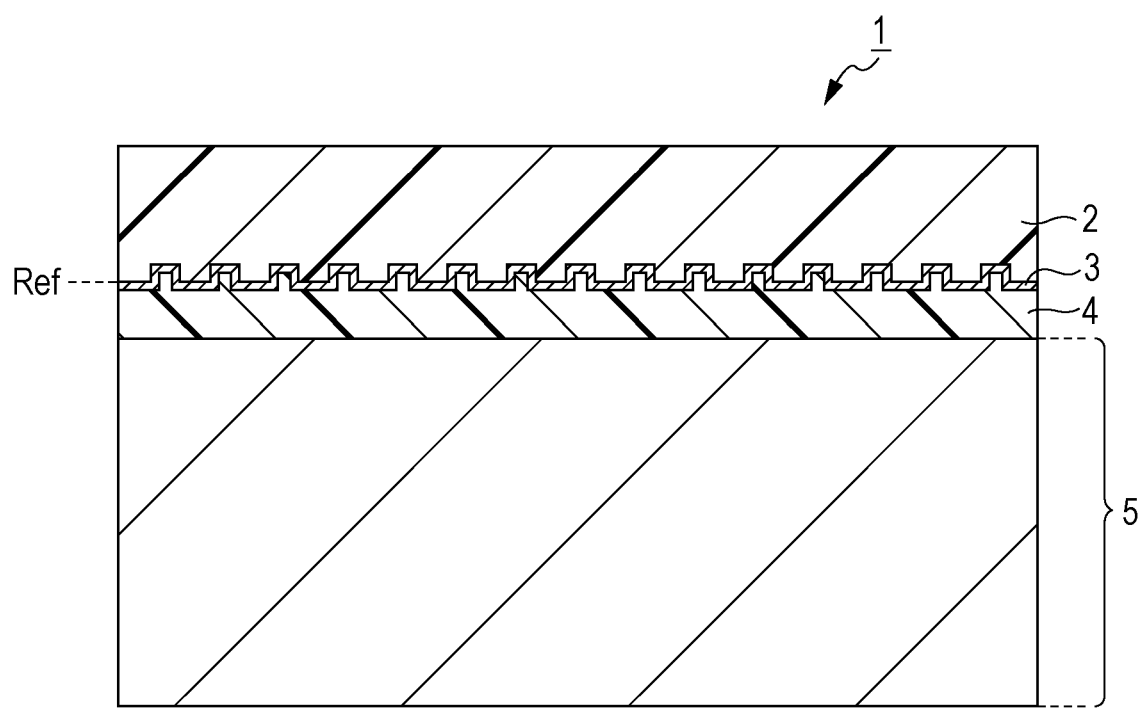
FIG. 1 is a cross-sectional configuration diagram of a bulk recording medium which is set as a recording and reproduction target in a preceding example and an embodiment.

Below, the embodiment of the disclosure will be described.
Here, in the specifications, before the description of the embodiment, first, description of a preceding example which was previously proposed by the applicant will be performed.
Here, the order of the description is as below.
1. Preceding Example
1-1. Optical Recording Medium which is Recording and Reproduction Target
1-2. Configuration of Optical System
1-3. Configuration of Reference Surface
1-4. Address Information
1-5. Method of Selecting Servo Target Position
1-6. Problems in Method of Sampling Push-Pull Signals
1-7. Entire Internal Configuration of Recording Device
1-8. Method of Realizing Arbitrary Recording Pitch
2. Embodiment
2-1. Problems with Preceding Example
2-2. Method of Realizing Arbitrary Pitch in Embodiment
2-3. Configuration of Recording Device of Embodiment
3. Modified Examples 1. Preceding Example 1-1. Optical Recording Medium which is Recording and Reproduction Target FIG. 1 is a cross-sectional configuration diagram of an optical recording medium which is set as a recording and reproduction target in a preceding example (and an embodiment). The optical recording medium, which is set as a recording and reproduction target in an embodiment which will be described later and including the preceding example, is an optical recording medium of a so-called bulk recording type, and below, is referred to as a bulk recording medium 1.

The optical recording medium of the bulk type indicates an optical recording medium where so-called bulk recording is performed. Bulk recording indicates a technique where multi-layer recording is performed by sequentially changing a focus position and performing laser light irradiation with regard to a recording layer as a bulk layer 5 as shown in the diagram without having a multi-layer configuration where a plurality of recording films are formed such as with normal multi-layer optical discs.

In FIG. 1, the bulk recording medium 1 is an optical recording medium in a disk shape and mark recording (information recording) is performed by laser light irradiation being performed with regard to the bulk recording medium 1 which is rotationally driven. In addition, also in the reproduction of recording information, the irradiation of laser light is performed with regard to the bulk recording medium 1 which is rotationally driven.

Here, the optical recording medium is a generic term for a recording medium which performs recording and reproduction of information using the irradiation of light.

In the bulk recording medium 1 as shown in the diagram, a cover layer 2, a selective reflecting film 3, an intermediate layer 4, and a bulk layer 5 are formed in this order from the upper layer side.

Here, in the specifications, the "upper layer side" indicates an upper layer side when a surface, where laser light from a recording device side (recording and reproduction device 10) which will be described later is incident, is an upper surface.

In addition, in the specifications, a term of "depth direction" is used, and "depth direction" indicates a direction (that is, a direction which is parallel to an incidence direction of laser light from the recording device side; focus direction) which matches an up and down direction in accordance with the definition of an "upper layer direction".

In the bulk recording medium 1, the cover layer 2 described above is configured by, for example, a resin such as a polycarbonate or an acryl, and as shown in the diagram, irregularities in a cross-sectional shape are applied to a lower surface side by a pit row which will be described later being formed as a position guidance element for guiding a recording position. The cover layer 2 is created by injection molding or the like using a stamper which forms the pit row which will be described later.

Here, a specific pit row formation state in the bulk recording medium 1 will be described later.

In addition, the selection reflecting film 3 is deposited on a lower surface side of the cover layer 2 where the pit row is formed.

Here, in the bulk recording method such as that described previously with reference to FIG. 25, with regard to the bulk layer 5 which is the recording layer, light for performing mark recording and reproduction (laser light for recording and reproduction) is irradiated and light for obtaining a tracking error signal and a focus error signal (laser light for servos) are separately irradiated based on the position guidance element such as the pit row described above.

At this time, assuming that the laser light for servos reaches the bulk layer 5, there is a concern that a negative influence may be applied to the mark recording in the bulk layer 5. As a result, a reflective film, which has wavelength selectivity where the laser light for servos is reflected and the laser light for recording and reproduction is transmitted, is necessary.

In the bulk recording method in the related art, the laser light for recording and reproduction and the laser light for servos use laser light which respectively have different wavelength ranges, and to correspond to this, as the selective reflecting film 3, a selective reflecting film is used which has wavelength selectivity where light with the same wavelength as the laser light for servos is reflected and the light using other wavelengths is transmitted.

Here, below, the reflective surface of the selective reflecting film 3 (the surface where the irregularities with a cross-sectional shape are applied in accordance with the pit row as the position guidance element) is referred to as a reference surface Ref.

The bulk layer 5 which is the recording layer is laminated (adhered) on the lower layer side of the selective reflecting film 3 via the intermediate layer 4 which is configured by an adhesive material such as a UV curing resin.

As the forming material (recording material) of the bulk layer 5, it is sufficient if an appropriate optimal material is adopted in accordance with a bulk recording method adopted in the micro-hologram method, such as the positive-type micro-hologram method and the negative-type micro-hologram method previously used as examples, or the void recording method.

Here, in the embodiment of the disclosure, the mark recording method with regard to the bulk layer is not particularly limited and it is sufficient if an arbitrary method is adopted in regard to bulk recording methods. In the description below, as an example, the void recording method described above is adopted.

Figure 25:
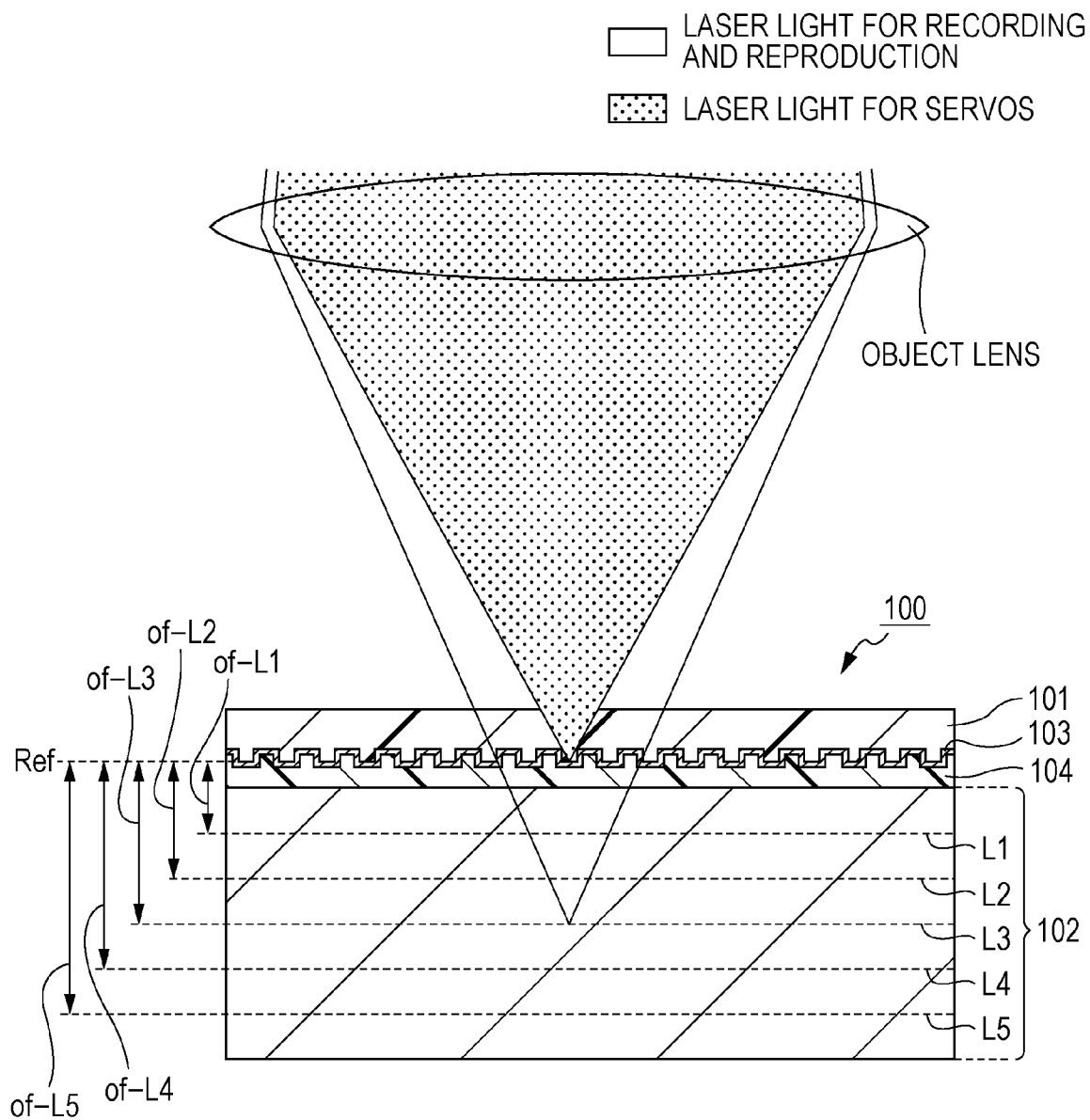
FIG. 25 is a diagram for describing a mark recording and reproduction method with regard to a bulk recording medium.

Here, when multi-layer recording is performed with regard to the bulk layer 5 where a guidance groove or reflective layer is not formed, the positioning of a layer position where a mark is recorded is set in advance in the depth direction in the bulk layer 5 (refer to FIG. 25). In this case, as the layer position where the mark is formed in the bulk layer 5 (mark forming layer position: also called information recording layer position), for example, a total of five information recording layer positions L of a first information recording layer position L1 to a fifth information recording layer position L5 are set in the same manner as the previous case of FIG. 25.

In this case, information on offsets of-L of the respective information recording layer positions L from the reference surface Ref is set by a controller 41 of a recording and reproduction device 10 as a preceding example which will be described later (which is the same as a controller 53 of the embodiment).

1-2. Configuration of Optical System

Figure 2:
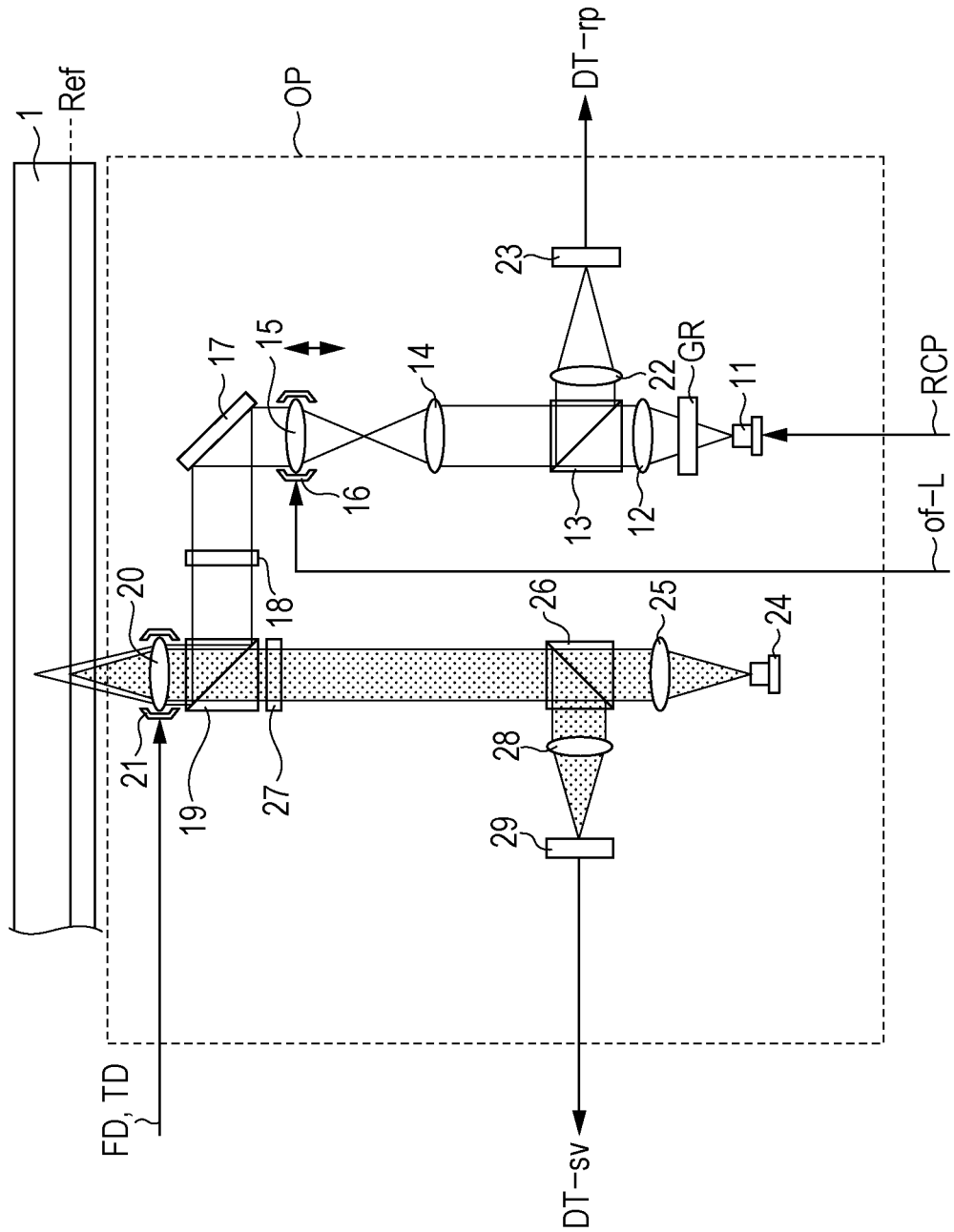
FIG. 2 is a diagram mainly illustrating a configuration of an optical system which is provided in a recording device of a preceding example and an embodiment.

FIG. 2 is a diagram for mainly describing a configuration of an optical system which is provided in the recording and reproduction device which performs recording and reproduction with regard to the bulk recording medium 1 described above. Specifically, an internal configuration of an optical pickup OP, which is provided in the recording and reproduction device 10, is mainly shown.

Figure 4:
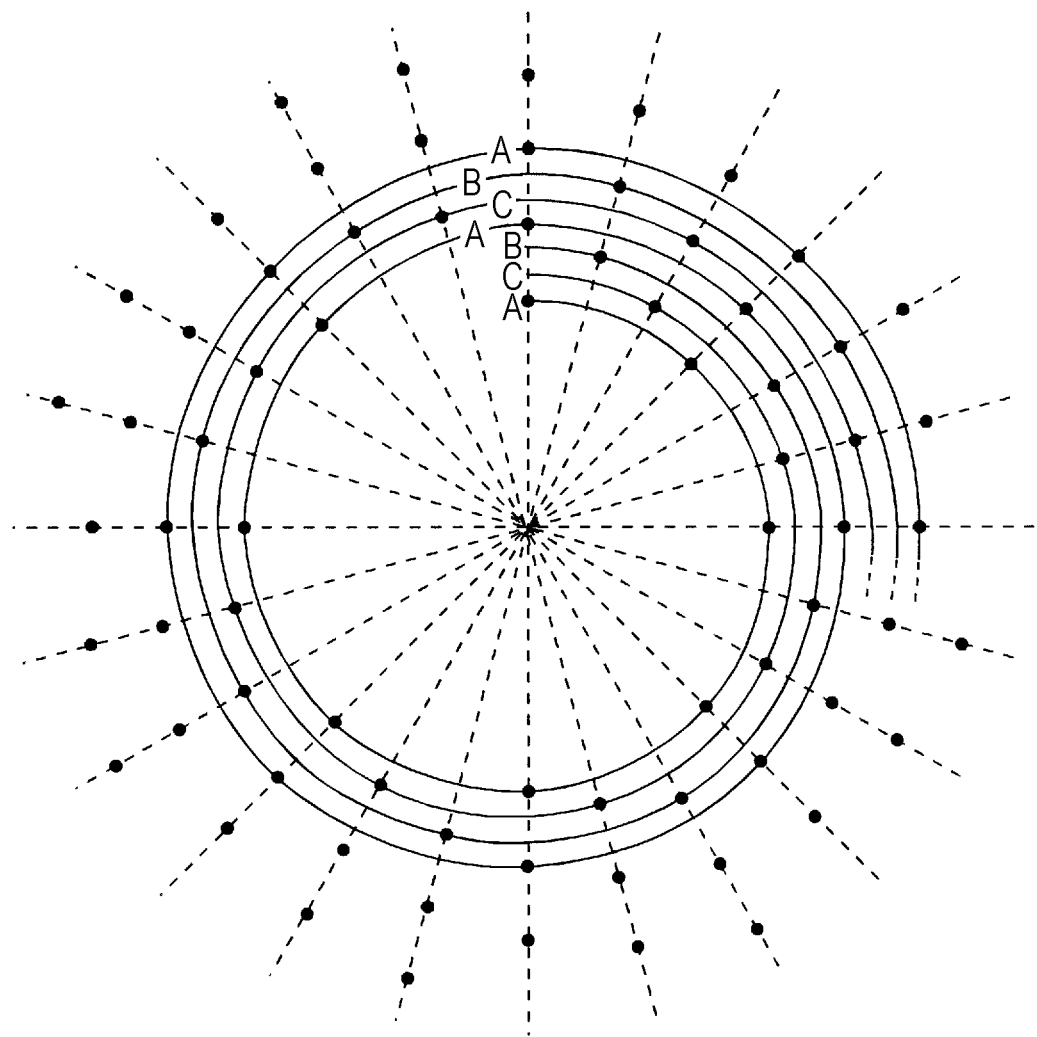
FIG. 4 is a diagram for describing a pit formation state in the entire reference surface.

In FIG. 4, the bulk recording medium 1 which is mounted in the recording and reproduction device 10 is set so as a center hole is clamped in a predetermined position in the recording and reproduction device 10 and is maintained in a state where it is possible to be rotationally driven using a spindle motor 44n (FIG. 11) which is omitted from the diagram here.

The optical pickup OP is provided for irradiating laser light for recording and reproduction and laser light for servos with regard to the bulk recording medium 1 which is rotationally driven using the spindle motor 44.

In the optical pickup OP, a recording and reproduction laser 11, which is a light source of the laser light for recording and reproduction which performs information recording using marks and the reproduction of information recorded using marks, and a servo laser 24, which is a light source of the laser light for servos which is light for performing position control using the position guidance element which is formed in the reference surface Ref, are provided.

Here, the laser light for recording and reproduction and the laser light for servos as described above each have different wavelengths. In the case of this example, the weight length of the laser light for recording and reproduction is approximately 405 nm (so-called blue laser light) and the wavelength of the laser light for servos is approximately 650 nm (red laser light).

In addition, in the optical pickup OP, an object lens 20 is provided which is at an output end of the laser light for recording and reproduction and the laser light for servos to the bulk recording medium 1.

Furthermore, a recording and reproduction light reception section 23 for receiving reflected light of the laser light for recording and reproduction from the bulk recording medium 1 and a servo light reception section 29 for receiving reflected light of the laser light for servos from the bulk recording medium 1 are provided.

Also, in the optical pickup OP, an optical system is formed for leading the laser light for recording and reproduction output from the recording and reproduction laser 11 to the object lens 20 and leading the reflected laser light of the laser light for recording and reproduction from the bulk recording medium 1 incident on the target lens 20 to the recording and reproduction light reception light section 23.

Specifically, after being made into parallel light via a collimation lens 12, the laser light for recording and reproduction output by the recording and reproduction laser 11 is irradiated onto a polarized light beam splitter 13. The polarized light beam splitter 13 is configured to transmit the laser light for recording and reproduction incident from the recording and reproduction laser 11.

The laser light for recording and reproduction which is transmitted by the polarized light beam splitter 13 is irradiated onto an expander which is formed from a fixed lens 14, a movable lens 15, and a lens driving section 16. The expander is equivalent to the recording and reproduction light focus mechanism described above and performs focus control which is independent with regard to the laser light for recording and reproduction by the fixed lens 14 being on a side which is close to the recording and reproduction laser 11 which is a light source, the movable lens 15 being positioned on a side far from the recording and reproduction laser 11, and the moveable lens 15 being driven in a parallel direction to the light axis of the laser light for recording and reproduction using the lens driving section 16.

As will be described later, the lens driving section 16 of the recording and reproduction light focus mechanism is driven in accordance with the value of the offset of-L which is set in regard to the information recording layer position L which is a target by the controller 41 sown in FIG. 11.

After being reflected by a mirror 17 as shown in the diagram, the laser light for recording and reproduction which passes through the fixed lens 14 and the movable lens 15 of the recording and reproduction light focus mechanism is irradiated onto a dichroic prism 19 via a ¼ wavelength plate 18.

The dichroic prism 19 is configured so as to reflect light of the same wavelength as the laser light for recording and reproduction and to transmit the light of other wavelengths. Accordingly, the laser light for recording and reproduction irradiated as described above is reflected at the dichroic prism 19.

The laser light for recording and reproduction reflected at the dichroic prism 19 is irradiated with regard to the bulk recording medium 1 via the object lens 20 as shown in the diagram.

With regard to the object lens 20, a biaxial actuator 21 is provided which maintains the object lens 20 to be able to change position in the focus direction (direction of approaching and moving away from the bulk recording medium 1) and the tracking direction (direction which intersects the focus direction: the radial direction of the bulk recording medium 1).

In the biaxial actuator 21, a focus coil and a tracking coil are provided and the object lens 20 changes position in each of the focus direction and the tracking direction due to the application of respective driving signals (driving signals FD and TD which will be described later).

Here, when reproducing, the reflected light of the laser light for recording and reproduction is obtained from the bulk recording medium 1 (row of marks recorded on the information recording layer positions L which are recording targets in the bulk layer 5) in accordance with the irradiation of laser light for recording and reproduction with regard to the bulk recording medium 1 as described above. The reflected light of the laser light for recording and reproduction obtained in this manner is lead to the dichroic prism 19 via the object lens 20 and is reflected by the dichroic prism 19.

After passing through the ¼ wavelength plate 18→the mirror 17→the recording and reproduction light focus mechanism (the moveable lens 15→the fixed lens 14), the reflected light of the laser light for recording and reproduction reflected by the dichroic prism 19 is irradiated onto the polarized light beam splitter 13.

Here, the reflected light of the laser light for recording and reproduction irradiated onto the polarized light beam splitter 13 in this manner (returning light) has a polarization direction which is different by 90 degrees from the laser light for recording and reproduction irradiated onto the polarized light beam splitter 13 from the recording and reproduction laser 11 side (outgoing light) due to the operation of the ¼ wavelength plate 18 and the operation when reflecting at the bulk recording medium 1. As a result, the reflected light of the laser light for recording and reproduction irradiated as described above is reflected at the polarization light beam splitter 13.

The reflected light of the laser light for recording and reproduction reflected at the polarization light beam splitter 13 in this manner is focused on the light reception surface of the recording and reproduction light reception section 23 via a light focusing lens 22.

In addition, in the optical pickup OP, in addition to a configuration in the optical system in regard to the laser light for recording and reproduction described above, an optical system is formed for leading the laser light for servos output from the servo laser 24 to the object lens 20 and for leading the reflected light of the laser light for servos from the bulk recording medium 1 which is irritated onto the object lens 20 to the servo light reception section 29.

As shown in the diagram, after being made into parallel light by a collimation lens 25, the servo laser light output from the servo laser 24 is irradiated onto a polarized light beam splitter 26. The polarized light beam splitter 26 is configured to transmit the laser light for servos incident from the servo laser 24 (outgoing light) in this manner.

The laser light for servos which is transmitted by the polarized light beam splitter 26 is irradiated onto the dichroic prism 19 via a ¼ wavelength plate 27.

As described previously, since the dichroic prism 19 is configured so as to reflect light of the same wavelength as the laser light for recording and reproduction and to transmit the light of other wavelengths, the laser light for servos is transmitted by the dichroic prism 19 and is irradiated onto the bulk recording medium 1 via the object lens 20.

In addition, the reflected light of the laser light for servos which is obtained in accordance with laser light for servos being irradiated onto the bulk recording medium 1 in this manner (reflected light from the reference surface Ref) is transmitted by the dichroic prism 19 after passing through the object lens 20 and is irradiated onto the polarized light beam splitter 26 via the ¼ wavelength plate 27.

In the same manner as the previous case of the laser light for recording and reproduction, the reflected light of the servo laser light irradiated from the bulk recording medium 1 side in this manner (returning light) has a polarization direction which is different by 90 degrees from the outgoing light due to the operation of the ¼ wavelength plate 27 and the operation when reflecting at the bulk recording medium 1. Accordingly, the reflected light of the laser light for servos which is the returning light is reflected at the polarization light beam splitter 26.

The reflected light of the laser light for recording and reproduction reflected at the polarization light beam splitter 26 is focused on the light reception surface of the servo light reception section 29 via a light focusing lens 28.

Here, although description using a diagram is omitted, in practice, in the recording and reproduction device 10, a slide driving section is provided which slide drives the entire optical pickup OP described above in the tracking direction, and changing of the position of the irradiation position of the laser light over a wide range is possible due to the driving of the optical pickup OP using the slide driving section.

1-3. Configuration of Reference Surface

Here, the recording and reproduction device 10 which is a preceding example which has the optical pickup OP as described above is configured so as to, with regard to the optical recording medium which has the reference surface where the position guidance element is formed and the recording layer which is formed at a depth position different from the reference surface, irradiate a first light (the laser light for recording and reproduction) and a second light (laser light for servos) via the common object lens and perform tracking servo control of the object lens based on the reflected light of the second light from the reference surface.

As described above, in a case where a configuration such as this is adopted, there is a problem that the recording pitch in the recording layer using the first light depends on the tracking pitch in the reference surface and improvement in the recording density of the recording layer is not able to be achieved.

In order to achieve a solving of the problem, the present applicants previously proposed a method where a pit row is formed in a state described below as the position guidance element in the reference surface Ref.

Figure 3:
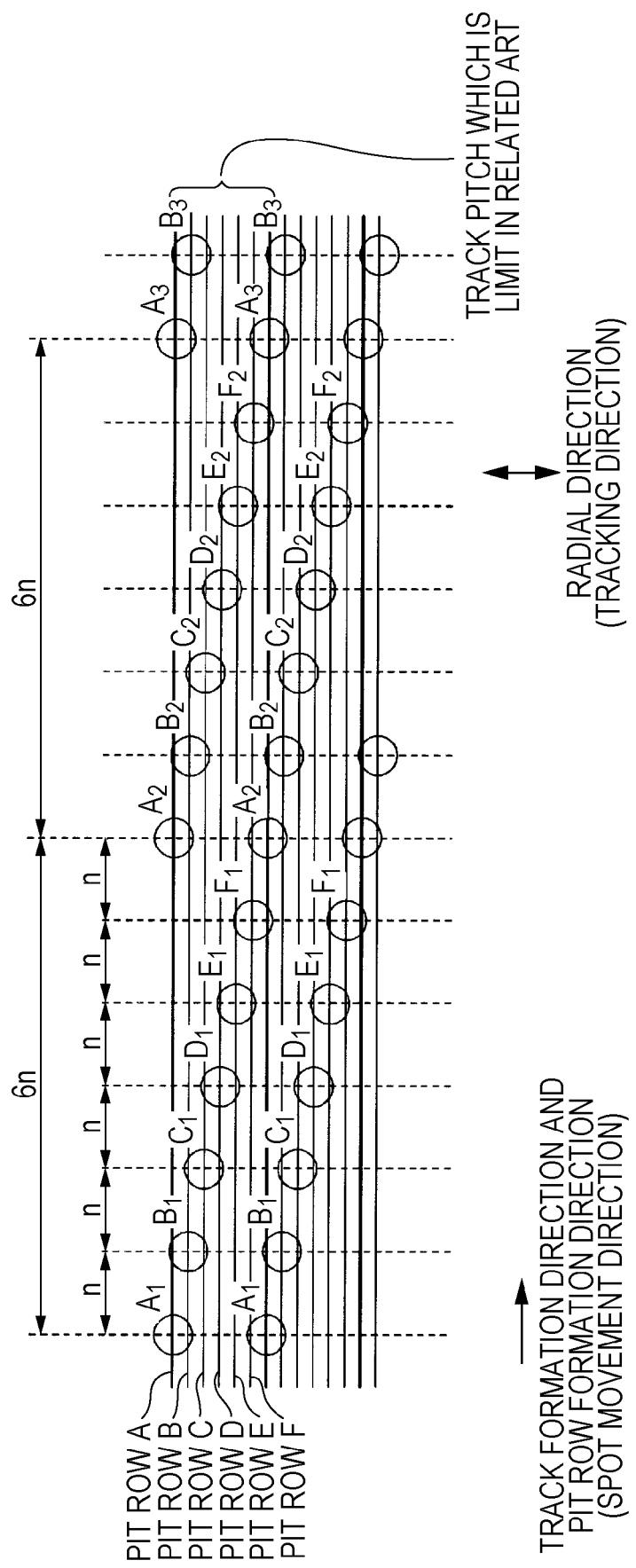
FIG. 3 is a planar diagram illustrating a partially enlarged surface of a reference surface of the bulk recording medium used in a preceding example and an embodiment.

FIG. 3 is a planar diagram illustrating a partially enlarged surface of the reference surface Ref (selective reflecting film 3) of the bulk recording medium 1.

In FIG. 3, a direction from the left side of the paper to the right side is a pit row formation direction, that is, a track formation direction (line direction). In this case, a spot of the laser light for servos moves from the left side of the paper to the right side in accordance with the rotation movement of the bulk recording medium 1.

In addition, a direction which intersects the pit row formation direction (vertical direction on the paper) is the radial direction of the bulk recording layer 1.

In this case, a spot progression direction in the radial direction (that is, the same as a recording progression direction in the radial direction of the bulk layer 5) is assumed to be from an inner circumference→an outer circumference.

In FIG. 3, A to F which are shown by white circles in the diagram represent pit formable positions. That is, in the reference surface Ref, the pit is only formed in the pit formable positions and pit formation is not able to be performed except for the pit formable positions.

In addition, other than the reference numerals A to F in the diagram, other pit rows (other pit rows which are arranged in the radial direction) are represented and the number attached to the reference numerals A to F represents other pit formable positions in the pit row.

Here, intervals which are represented by thick black lines in the diagram represent track pitches which are the smallest which are able to be realized in the bulk recording medium 1 in the related art. As will be understood from this, in the bulk recording medium 1 of the embodiment, a total of six pit rows A to F are formed in one track width which is the limit in the related art, that is, are arranged in a pitch which exceeds the optical limits in the radial direction.

However, there is a concern that by only simply arranging a plurality of pit rows in one track width which is the limit in the related art, the pit formation positions in the pit row formation direction will overlap, that is, there is a concern that the intervals between the pits in the pit row formation direction will exceed the optical limit.

Therefore, in this example, the conditions below are set so as the intervals between pits between the plurality of pit rows A to F, which are arranged in one track width which is the limit in the related art, do not exceed the optical limited in the pit row formation direction.

That is, 1) the intervals of the pit formable positions in each of the pit rows A to F are limited to a predetermined first interval, and 2) each of the pit rows A to F where the intervals of the pit formable positions are limited in this manner are arranged so as that the pit formable positions are each deviated by a predetermined second interval in the pit row formation direction (that is, the phase of each of the pit rows is deviated by the second interval).

Here, the interval (the second interval) of each of the pit formable positions in the pit row formation direction in the pit rows A to F which are arranged in the radial direction is set as n. At this time, by arranging each of the pit rows A to F in order to satisfy the condition 2, the intervals between each of the pit formable positions of pit row A-B, pit row B-C, pit row C-D, pit row D-E, pit row E-F, and pit row F-A are all n as shown in the diagram.

In addition, the intervals (the first interval) of the pit formable positions in each of the pit rows A to F is set as 6n in order to realize the total of six pit row phases of A to F in this case.

In this example, the information reproduction and servo control using the laser light for servos in the reference surface Ref is performed with a condition of a wavelength λ of approximately 650 nm which is the same as the case of a DVD (Digital Versatile Disc) and a numerical aperture NA of approximately 0.65. Corresponding to this, in this example, the sector length of each of the pit formable positions is set as a sector length of 3T (where T is a channel bit) which is the same as the shortest mark in a DVD, and the intervals between edges of each of the pit formable positions A to F in the pit row formation direction is set to a length of 3T in the same manner. That is, due to this, n=6T.

As a result, the conditions 1 and 2 are satisfied.

Here, in order to understand the pit formation state in the entire reference surface Ref, a specific pit row formation method will be described with reference to FIG. 4.

Here, in FIG. 4, a case is shown as an example where the types (phases) of the pit rows are set as only three types of A to C for ease of diagrammatical representation.

In addition, in the diagram, the black circles represent the pit formable positions.

As will be understood with reference to FIG. 4, in the reference surface Ref of the bulk recording medium 1, a plurality of types of pit rows which each have different phases (three types of A to C in FIG. 4 but actually six types of A to F) are one set and one set of the plurality of types of pit rows is formed in a spiral shape.

Due to this, by continually applying a tracking servo which targets one predetermined type of pit row out of the plurality of types of pit rows, a trajectory of a spot position is traced out in a spiral shape.

Here, the pit is formed in the reference surface Ref using a CAV (constant angular velocity) method. Due to this, each of the plurality of types of pit rows shown in the diagram have the pit formation positions (pit formable positions) arranged in the same angular position in the radial direction.

Here, the recording of the pits in the reference surface Ref using the CAV method in this manner is in order to maintain the phase relationship of each of the pit rows A to F as shown in FIG. 3 in any region on the disc.

1-4. Address Information

Figure 5:
FIGS. 5A to 5C are diagrams for describing a format of address information.

Next, an example of a format of address information which is recorded on the reference surface Ref will be described using FIGS. 5A to 5C.

Here, below, in the description until FIG. 8, as the tracking error signal, it is assumed that a signal is generated based on a push-pull signal for ease of description. As will be made clear in the description later, in the actual configuration as the preceding example and the embodiment, as the tracking error signal, a signal is generated based on a sum signal.

In FIGS. 5A to 5C, first, FIG. 5A shows a relationship of the pit formable positions in each of the pit rows (A to F) which have pit row phases which are each different as an illustration. Here, in FIG. 5A, the pit formable positions are represented by a mark "*".

Here, as will also be described later, the recording and reproduction device 10 selects one pit row from the pit rows A to F and applies a tracking servo with the selected one pit row as the target.

However, at this time, the point that each of the pit rows A to F are arranged at a pitch which exceeds the optical limit in the radial direction is a problem. That is, in this case, as the tracking error servo (push-pull signal) which is obtained by moving (scanning) the irradiation spot of the servo laser light on the track, since all of the pits of A to F are included, it is not possible to track the one selected pit row even if the tracking servo is applied based on the tracking error signal.

As a result, in this example, there is a basic overview where the tracking error signal is sampled at the timing of the pit formable positions in the selected pit row and the tracking servo is applied based on the value of the sampled tracking error signal (that is, intermittently).

Then, in the same manner to this, also in a case of reading out the address information, so as only information which is recorded in the selected pit row is selectively read out, a method is adopted where a sum signal is sampled at the timing of the pit formable positions in the selected pit row and the address information is detected based on the value.

In order to correspond to an information detection method such as this, in this example, a format is adopted where "0" or "1" of a channel bit (recording code) is realised by the forming or non-forming of the pit in the pit formable position. That is, one pit formable position has information of one channel bit.

Also, one bit of data bits is realised by the data pattern of "0" or "1" using a plurality of the channel bits.

Specifically, in this example, the data sets "0" and "1" are realised by four channel bits as shown in FIG. 5B, and for example, a four channel bit pattern "1011" represents a data set "0" and a four channel bit pattern "1101" represents a data set "1".

At this time, the point that the channel bit "0" is not continuous is important. That is, since the channel bit "0" being continuous has the meaning that a period where no error signal is obtained is continuous when based on that a servo is performed intermittently using the tracking error signal as described above, in accordance with this, securing of accuracy in the tracking servo is extremely difficult.

As a result, in this example, for example, using the definition of data bits such as that described above, the condition that the channel bit "0" is not continuous is satisfied. That is, using the definition of data bits such as that described above, a reduction in accuracy of the tracking servo is suppressed to a minimum.

FIG. 5C shows an example of a sync pattern.

For example, with regard to the sync pattern, different (types of) syncs are represented as a realization using a 12 channel bit as shown in the diagram where there is a channel bit pattern "11111111" which does not fit into the definition of the data bits in the first portion with a pattern of four channel bits after that. Specifically, if it is the channel bit pattern of "1011" after the eight bits, it is Sync 1 or if it is the channel bit pattern of "1101" after the eight bits, it is Sync 2.

In the bulk recording medium 1, the address information is recorded continuously after a sync such as this.

Here, as the address information, absolute position information (radial position information and rotational angle position information) on a disc is recorded.

Here, as description for confirmation, in this example, the plurality of pit rows of A to F are arranged in the one track width which is the limit in the related art, but the recording of the address information is performed by allocating individual information for each of the pit rows so that the radial positions of each of the pit rows are individually represented (so as identification of each of the pit rows is possible). That is, the same address information is not recorded with regard to each of the pit rows A to F which are arranged in one track width which is the limit in the related art.

Here, as will also be understood from the description of FIGS. 5A to 5C, the pits are position recorded with regard to the reference surface Ref of the bulk recording medium 1. Position recording indicates a recording method where the pit (or mark) formation portions are set with channel data "1" and other portions are set with channel data "0".

1-5. Method of Selecting Servo Target Position

A method, which is for applying a tracking servo with an arbitrary pit row as the target from among the pit rows formed so that there is a plurality arranged in one track width of the related art as described above, is based on the method specifically described below.

Figure 6:
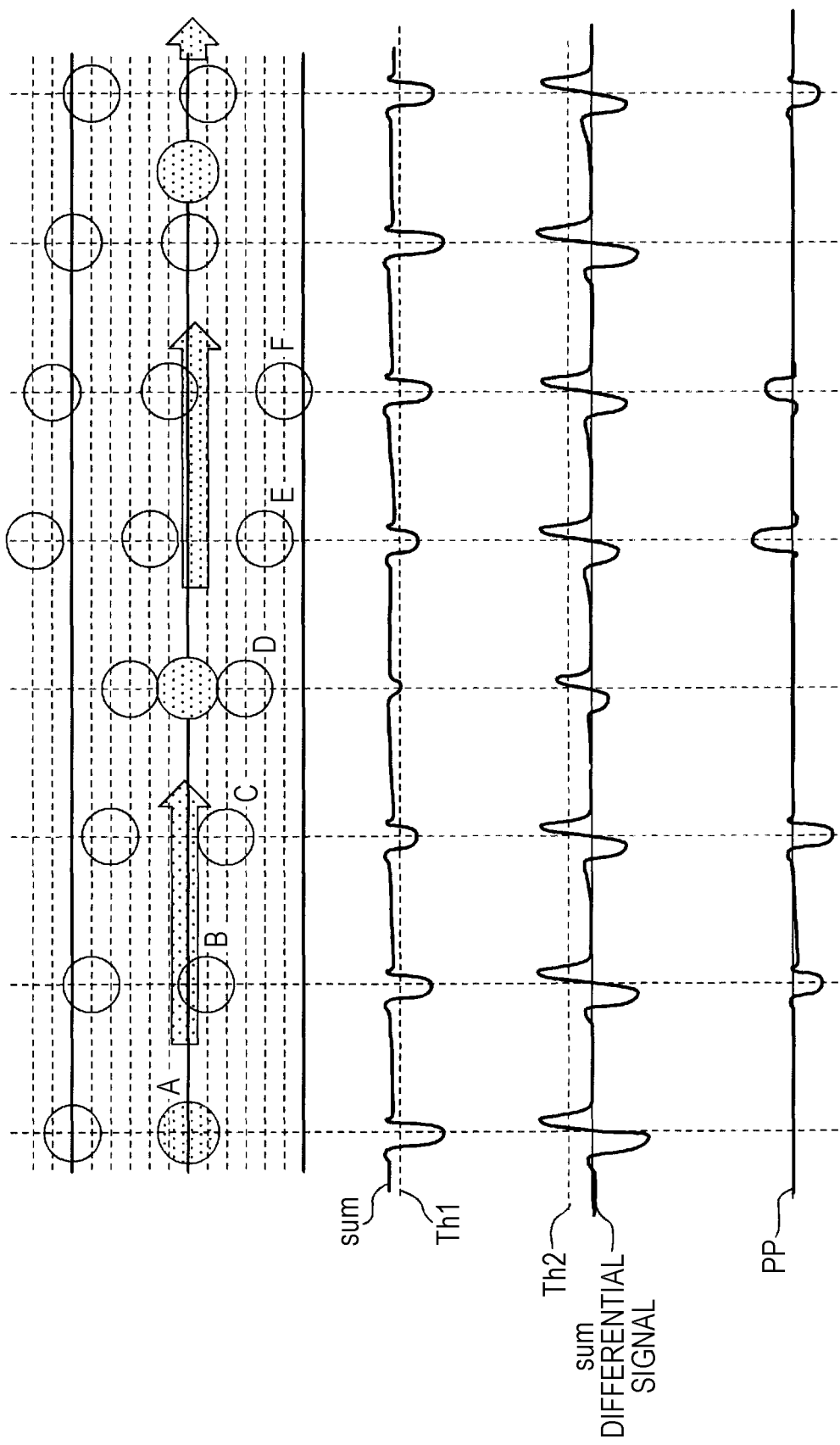
FIG. 6 is a diagram schematically illustrating a relationship between an appearance of movement of spots of laser light for servos on the reference surface in accordance with the rotation driving of the bulk recording medium and waveforms of a sum signal, a sum differential signal, and a PP (push-pull) signal obtained during the movement.

FIG. 6 schematically shows a relationship between an appearance of movement of spots of the laser light for servos on the reference surface Ref in accordance with the rotation driving of the bulk recording medium 1 and waveforms of a sum signal, a sum differential signal, and a PP (push-pull) signal PP (also referred to as PP signal) obtained during the movement.

The sum signal is a sum signal of a light reception signal DT-sv from a plurality of light reception elements as the servo light reception section 29 shown in FIG. 2 and the sum differential signal is a signal obtained by differentiating the sum signal.

Here, in the diagram, for ease of description, pits are formed in all of the respective pit formable positions in the diagram.

As shown in the diagram, in accordance with the beam spot of the laser light for servos moving in accordance with the rotation of the bulk recording medium 1, the signal level of the sum signal approaches a peak in cycles in accordance with the arrangement intervals of each of the pits A to F in the pit row formation direction. That is, the sum signal represents the intervals (formation cycles) of each of the pits A to F in the pit row formation direction.

Here, in the example in the diagram, since the spot of the laser light for servos moves along above the pit row A, there is a tendency that the peak value of the sum signal is largest (as an absolute value) when passing the formation position of the pit A in the pit row formation direction and the peak value of the sum signal gradually decreases in the formation positions of each of the pits B to D. Then, after that, the peak value turns to an upward trend in order of the formation position of the pit E→the formation position of the pit F and the peak value is largest when reaching the formation position of the pit A. That is, in the formation positions of the pits E and F in the pit row formation direction, since influence of the pits in the pit rows E and F which are adjacent to the outer circumference side is received, the peak value of the sum signal increases in order for each of the formation positions of the pits E and F.

In addition, as the sum differential signal which is generated by differentiating the sum signal and the PP signal as the tracking error signal, respective waveforms are obtained as shown in the diagram.

The sum differential signal is used for the generating of a clock CLK in accordance with the intervals of the pit formation positions of each of the pit rows A to F in the pit row formation direction (strictly speaking, the pit formable positions).

Specifically, as the clock CLK, a signal is generated where the position (timing) which is equivalent to an intermediate position of each of the pits (peak position) is a rising position (timing) by using the sum differential signal.

Figure 7:
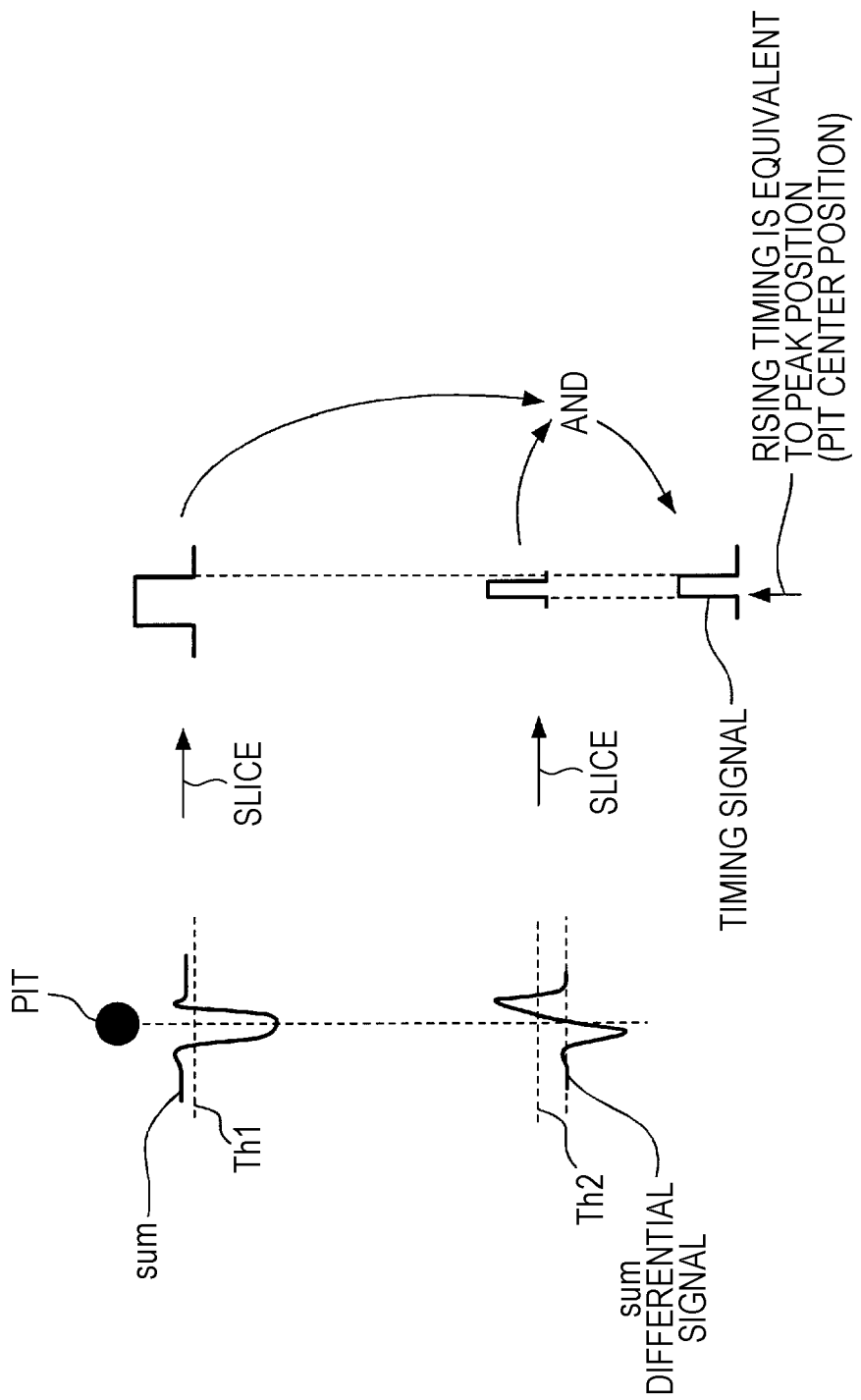
FIG. 7 is a diagram for describing a specific method of peak position detection.

As a generating method of the clock CLK, as shown in FIG. 7, first, a signal where the sum signal is sliced at a predetermined threshold Th1 and a signal where the sum differential signal is sliced at a predetermined threshold Th2 in the same manner are generated. Then, by taking an AND of the signals, a timing signal is generated which has a rising timing equivalent to the peak position.

The clock CLK is generated by a PLL (Phase Locked Loop) process being performed with the timing signal generated in this manner as an input signal (reference signal).

Figure 8:
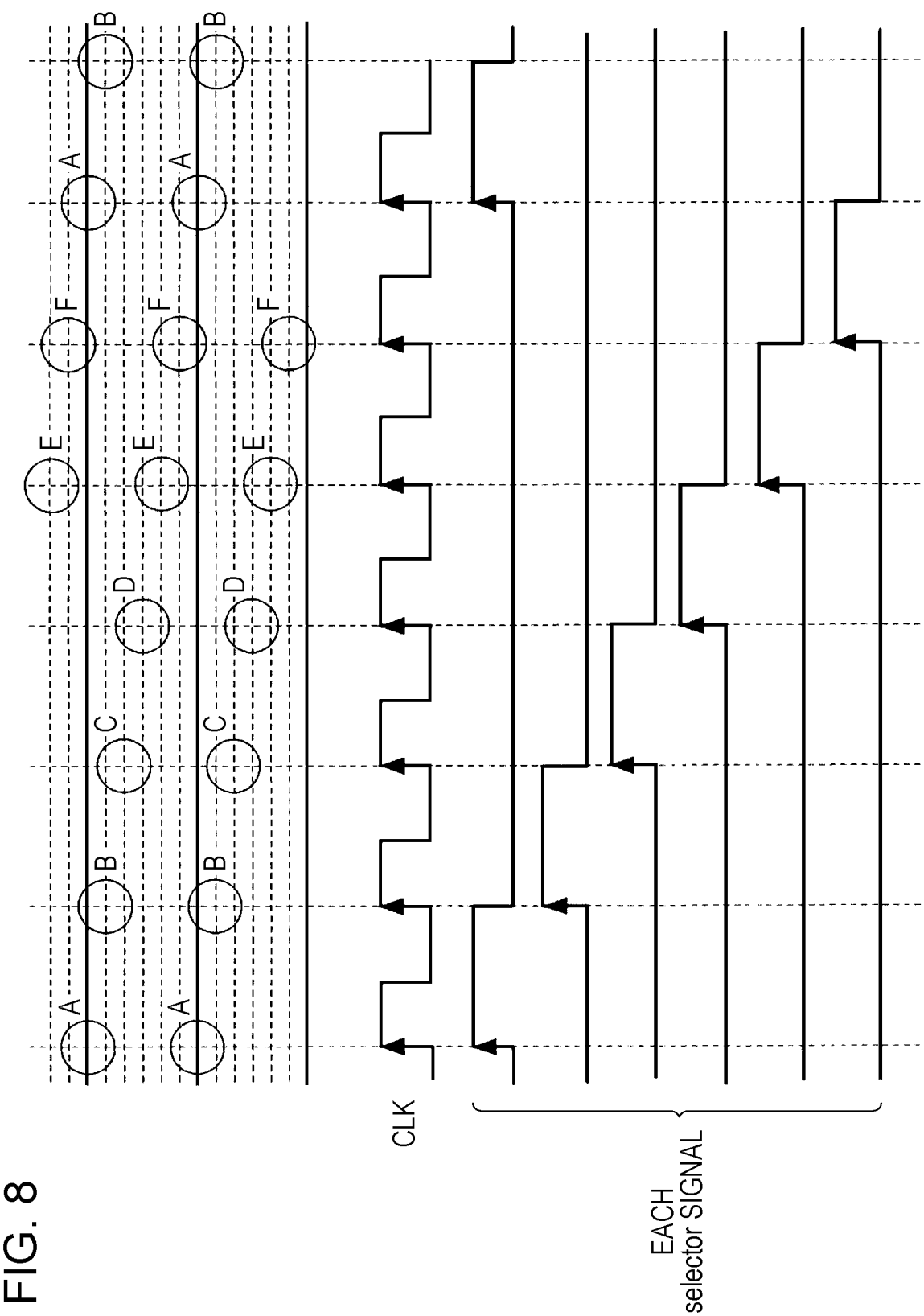
FIG. 8 is a diagram schematically illustrating a relationship between a clock which is generated from a timing signal which represents a peak timing, a waveform of each selector signal generated based on the clock, and (a portion of) each pit row formed in the reference surface.

FIG. 8 schematically illustrates a relationship between the clock CLK which is generated using the sequence above, a waveform of each selector signal generated based on the clock CLK, and (a portion of) each of the pit rows formed in the reference surface Ref.

As will be also made clear from the diagram, there is a signal as the clock CLK which has a cycle in accordance with the formation intervals of the pits A to F. Specifically, there is a signal which has a rising timing in the peak position of the pits A to F.

From the clock CLK, six types of selector signals are generated which represent the timings of the pit formable positions of each of A to F.

Specifically, the selector signals are each generated by the clock CLK being divided into six and respective phases are shifted by ⅙ of a cycle. In other words, each of the selector signals is generated by dividing the clock CLK into six at the respective timings so that the respective rising timings are shifted by ⅙ of a cycle.

The selector signals are each signals which represent the timings of the pit formable positions of the pit rows which correspond to A to F. Accordingly, having generated the selector signals, an arbitrary selector signal is selected and the tracking error signal (push-pull signal) is sampled and held at a timing represented by the selected selector signal, and thus it is possible to obtain the tracking error signal for the tracking of one pit row out of A to F. That is, by performing tracking servo control with regard to the object lens 20 based on the tracking error signal which is generated in this manner, it is possible to trace the spot of the laser light for servos on an arbitrary pit row out of the pit rows A to F.

1-6. Problems in Method of Sampling Push-Pull Signals

Here, in the description above, a signal where a push-pull signal is sampled and held as the tracking error signal for selection of an arbitrary pit row as the servo target is used in the description above, but in a case where a push-pull signal is used in this manner, there is a concern that obtaining of accurate tracking error information is not possible due to so-called skewing or lens shifting of the object lens.

Figure 9A:
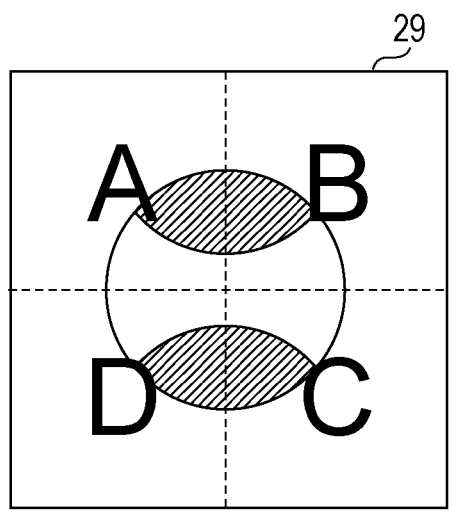
FIGS. 9A and 9B are diagrams for describing light reception spot position deviation in reflected light due to skewing and lens shifting.
Figure 9B:
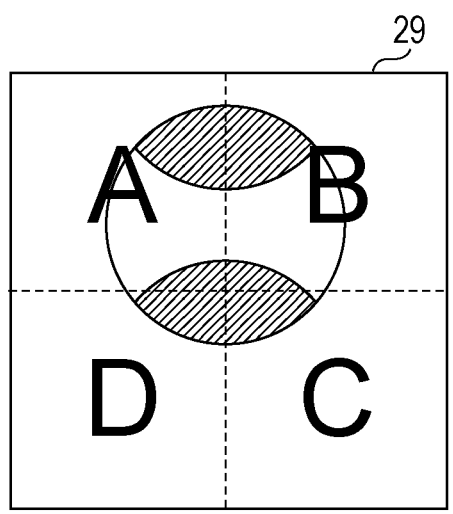

FIGS. 9A and 9B are diagrams for describing light reception spot position deviation in the reflected light due to skewing and lens shifting where FIG. 9A shows a reflected light spot (light reception spot) on the servo light reception section 29 in an ideal state where there is no skewing or lens shifting and FIG. 9B shows a reflected light spot (light reception spot) on the servo light reception section 29 in a case where there is skewing and lens shifting.

Here, in FIGS. 9A and 9B, the hatched portions which are shown in the reflected light spots represent the overlapping region of a first order diffracted light component from the pit formed on the disc (overlapping portion of push-pull signal component).

First, as an assumption, in a case of a grouping where a grouping of light reception elements A and B and the groupings of light reception elements C and D in the diagram are respectively adjacent in a direction which corresponds to the radial direction of the disc, the push-pull signal (PP) is calculated using $$PP=(Ai+Bi)-(Ci+Di) \quad \text{[equation 1]}$$

where Ai, Bi, Ci, and Di in [equation 1] are respectively the light reception signals of the light reception elements A, B, C, and D.

Here, it is assumed that the irradiation spot of the laser light for servos accurately traces on the pit row which is the target. In this case, if it is an ideal state of FIG. 9A where there is no skewing or lens shifting, the value of the push-pull signal PP which is calculated in accordance with [equation 1] is "zero".

On the other hand, in the case where there is reflected light spot position deviation due to skewing or lens shifting as shown in FIG. 9B, the value of the push-pull signal PP which is calculated using [equation 1] is a value different from "zero" which was to be originally obtained and there is an error.

As is understood from this, there is an offset in the push-pull signal PP due to the skewing and the lens shifting.

If the offset component due to the skewing and the lens shifting in this manner is to such an extent that is not able to be ignored, a method of generating a tracking error signal which is the same as that described above is effective, but it is desirable that the offset component as described above does not overlap in the tracking error signal in order to achieve an improvement in the stability of the tracking servo control.

In the related art, as a tracking error detection method for avoiding the influence of the offset due to skewing and lens shifting, there is known a so-called three spot method, but the addition of optical parts such as a grating is necessary in the three spot method, and to that extent, there is an increase in the cost of parts and adjustment costs.

In addition, a DPP (Differential Push Pull) method is also known as a tracking error detection method for avoiding the influence of the offset, but in the same manner, the addition of a grating or the like is necessary in the DPP method and there is an increase in the cost of parts and adjustment costs.

In order to achieve a solution to the problems in the tracking error detection method in the related art and to avoid the influence of the offset component due to skewing and lens shifting, a tracking error signal is generated in the preceding example (and similarly in the embodiment) by a method using the sum signal as described above.

Figure 10:
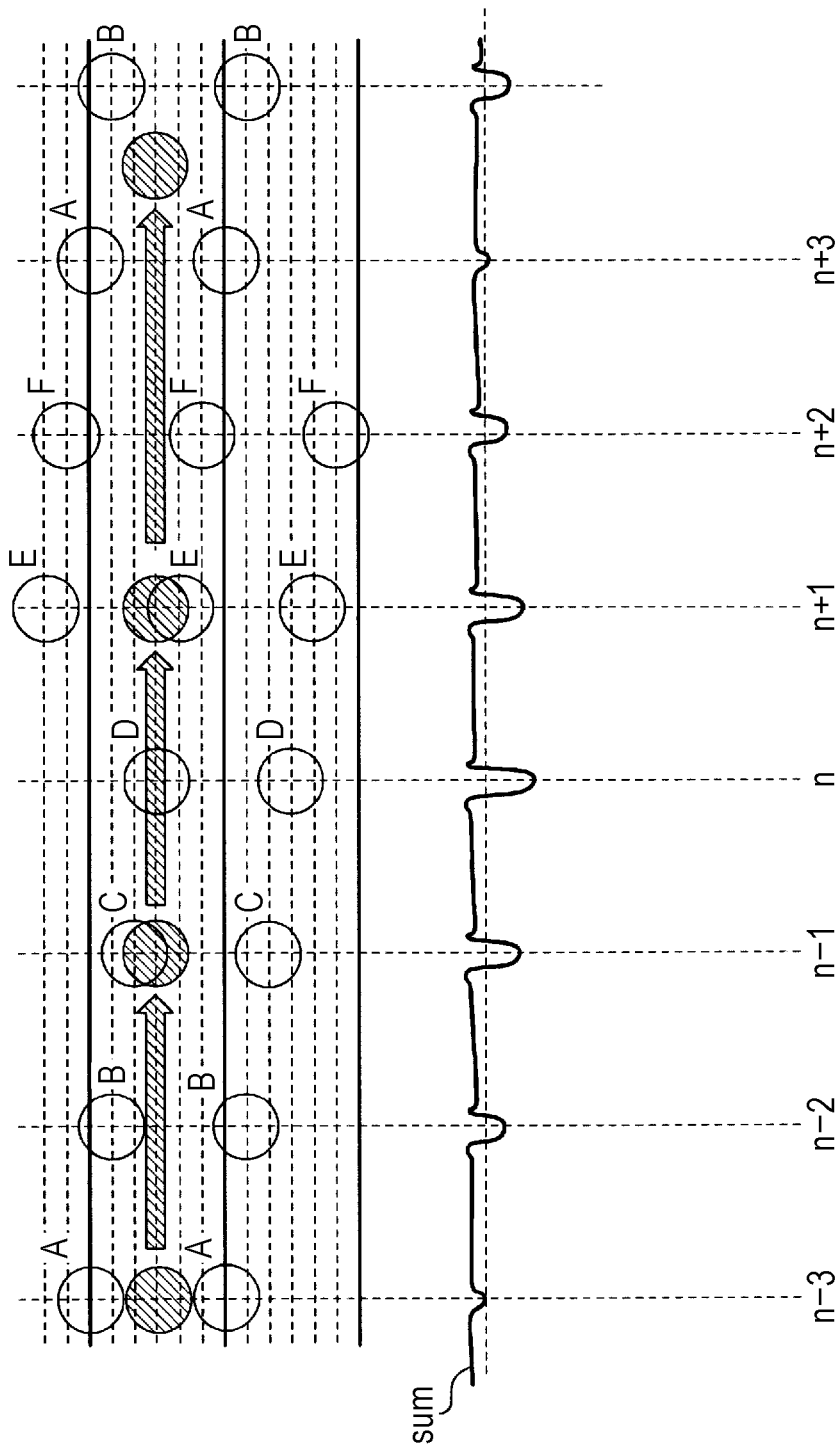
FIG. 10 is a diagram for describing a method for generating a tracking error signal in a preceding example.

FIG. 10 is a diagram for describing a method for generating a tracking error signal in a preceding example.

Here, each of the pit rows A to F formed on the reference signal Ref, a movement trajectory of the spot position of the laser light for servos (hatched portion) in a state where the tracking servo is applied so as to trace the pits row D, and a waveform of the sum signal obtained in accordance with the movement of the laser light for servos are shown in FIG. 10.

For example, as shown in FIG. 10, in a case where the spot of the laser light for servos is accurately traced on the pit row D, as the value of the sum signal, the smallest value at the timing (n in the diagram), which matches the pit formation position on the pit row D, is taken, and there is a trend that the value at the pit formation position becomes gradually larger for the pit rows where the phase difference with regard to the pit row D becomes larger.

At this time, the value of the sum signal takes the same value in the timing (n−1 and n+1 in the diagram) which matches the respective pit formation positions of the pit row C and the pit row E which are each adjacent with regard to the pit row D (that is, which have the same phase difference), and in addition, takes the same value also in the timing (n−2 and n+2 in the diagram) which matches the respective pit formation positions of the pit row B and the pit row F which are separated (that is, which have the same phase difference) with regard to the pit row D by the same distance (distance in the radial direction).

Here, different to the state in the diagram, when a position where the spot of the laser light for servos is deviated from the pit row D in the radial direction, it is understood that there is deviation in the value of the sum signal at the respective pit formation positions in the groupings of the respective pit rows which have the same phase difference with regard to the pit row D.

That is, as will be understood from this, the value of the sum signal at the respective pit formation positions in the groupings of the respective pit rows, which have the same phase difference with regard to the pit row which is the target of the tracking servo, reflects an error in the tracking direction with regard to the pit row which is the target of the tracking servo. Specifically, it is possible to obtain the tracking error information by calculating the difference in the value of the sum signal at the respective pit formation position in the groupings of the respective pit rows which have the same phase difference.

In regard this point, in the preceding example, specifically, generation of the tracking error signal is performed based on the sum signal as shown below.

That is, first, two pit rows, which have the same phase difference with regard to the pit row which is the target of the tracking servo, are selected. Specifically, in the case of this example, the pit rows, which are each adjacent to the pit row which is the target of the tracking servo, are selected.

Also, at a timing (equivalent to n−1 and n+1 in FIG. 10) which corresponds to the pit formation positions of the respective selected pit row, the value of the sum signal is sampled and the difference with the value of the sampled sum signal is calculated. The result of the calculation is the tracking error signal with regard to the pit row which is the servo target.

1-7. Entire Internal Configuration of Recording Device

Based on the description above, the entire configuration of the recording device (the recording and reproduction device 10) as the preceding example will be described.

Figure 11:
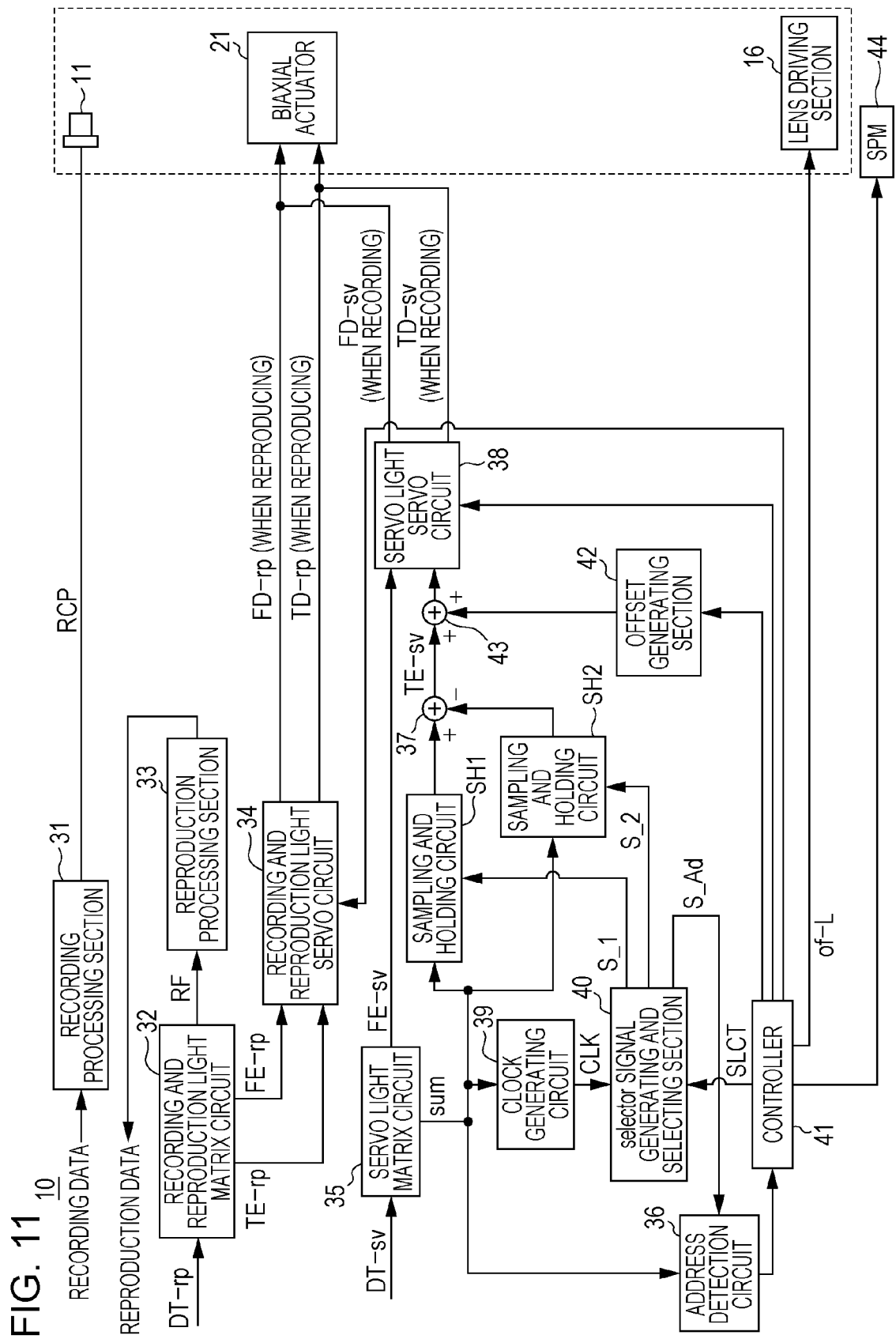
FIG. 11 is a block diagram illustrating an entire internal configuration of a recording device as a preceding example.

FIG. 11 illustrates an entire internal configuration of the recording and reproduction device 10.

Here in FIG. 11, in regard to the internal configuration of the optical pickup OP, only the recording and reproduction laser 11, the lens driving section 16, and the biaxial actuator 21 are extracted and shown from the configuration shown previously in FIG. 2.

In FIG. 11, the spindle motor 44 is provided in the recording and reproduction device 10.

The spindle motor 44 is provided with a FG (Frequency Generator) motor and rotationally drives the bulk recording medium 1 at a constant speed (constant rotation speed).

The spindle motor 44 performs starting and stopping of the rotation in accordance with instructions from the controller 41.

In addition, in the recording and reproduction device 10, a recording processing section 31, a recording and reproduction light matrix circuit 32, and a reproduction processing section 33 in the diagram are provided as a signal processing system for performing the focus and tracking servo control (that is, the position control based on the reflected light of the laser light for recording and reproduction) of the object lens 20 when recording and reproducing with the bulk layer 5 as the target and reproducing the recording marks.

Data (recording data) which is to record with regard to the bulk recording medium 1 is input in the recording processing section 31. The recording processing section 31 obtains a recording modification data which is, for example, a binary data row of "0" and "1" which is actually recorded in the bulk recording medium 1 by carrying out addition of error correction code and predetermined recording modification and coding with regard to the input recording data. Then, light emission driving of the recording and reproduction laser 11 in the optical pickup OP is performed using a recording pulse signal RCP in accordance with the recording modification data row generated in this manner.

The recording and reproduction light matrix circuit 32 is provided with a current-voltage conversion circuit, a matrix calculation and amplification circuit, and the like in correspondence with a light reception signal DT-rp (output current) from the plurality of light reception elements as the recording and reproduction light reception section 23 shown in FIG. 2 and generates a necessary signal using a matrix calculation process.

Specifically, a high frequency signal (hereinafter referred to as a reproduction signal RF) corresponding to the reproduction signal in regard to the recording modulation data row described above, a focus error signal FE-rp for focus servo control, and a tracking error signal TE-rp for tracking servo control are generated.

The reproduction signal RF generated in the recording and reproduction light matrix circuit 32 is supplied to the reproduction processing section 33.

In addition, the focus error signal FE-rp and the tracking error signal TE-rp are supplied with regard to a recording and reproduction light servo circuit 34.

The reproduction signal section 33 performs a reproduction process for reconstructing the recording data described above such as a binarization process with regard to the reproduction signal RF and a decrypting and error correction process of the recording modulation and coding and obtains reproduction data where the recording data has been reconstructed.

In addition, the recording and reproduction light servo circuit 34 generates a focus servo signal FS-rp and a tracking error signal TS-rp respectively based on the focus error signal FE-rp and the tracking error signal TE-rp which are supplied from the matrix circuit 32, and by driving the focus coil and the tracking coil of the biaxial actuator 21 based on a focus driving signal FD-rp and a tracking driving signal TD-rp based on the focus servo signal FS-rp and the tracking error signal TS-rp, focus servo control and tracking servo control is performed with regard to the laser light for recording and reproduction.

Describing for confirmation, the servo control (of the object lens and) of the biaxial actuator 21 based on the reflected light of the laser light for recording and reproduction is performed when reproducing.

In addition, the recording and reproduction light servo circuit 34 realizes a track jump operation by applying a jump pulse to the tracking coil with the tracking servo loop turned off in accordance with an instruction from the controller 41 in correspondence with when reproduction is being performed and also performs tracking servo inclusion control and the like. In addition, focus servo inclusion control and the like are also performed.

In addition, in the recording and reproduction device 10, a servo light matrix circuit 35, an address detection circuit 36, a sampling and holding circuit SH1, a sampling and holding circuit SH2, a subtraction section 37, a servo light servo circuit 38, a clock generating circuit 39, a selector signal generating and selecting section 40, an offset generating section 42, and an adding section 32 are provided as a signal processing system with regard to the reflected light of the laser light for servos.

Here, out of this configuration, the offset generating section 42 and the adding section 43 will described again later.

The servo light matrix circuit 35 generates a necessary signal based on the light reception signal DT-sv from the plurality of light reception elements of the servo light reception section 29 shown in FIG. 2.

Specifically, the servo light matrix circuit 35 in this case generates a sum signal which is a sum signal of the plurality of light reception signals and a focus error signal FE-sv for focus servo control.

The sum signal as shown in the diagram is supplied with regard to the sampling and holding circuit SH1, the sampling and holding circuit SH2, the clock generating circuit 39, and the address detection circuit 36.

In addition, the focus error signal FE-sv is supplied with regard to the servo light servo circuit 38.

The address detection circuit 36 inputs a selector signal S_Ad which is generated and selected using the selector signal generating and selecting section 40 in a manner which will be described later, and detects address information recorded in the reference surface Ref (at least absolute position information which includes radial direction position information and rotation angle position information) based on a result of the sampling of the sum signal from the servo light matrix circuit 35 at a timing of the pit formable positions represented by the selector signal S_Ad (the selector signal S_Ad is an H level section in this example).

Here, as described previously with reference to FIG. 5, in the case of this example, the address information of each of the pit rows is where the forming or non-forming of the pits at the pit formable positions in the pit rows is recorded as 1 channel bit information. In accordance with this, the address detection circuit 36 performs data identification of the one channel bits of "0" and "1" by identifying the value of the sum signal at a rising timing of the selector signal S_Ad, and based on the result, performs detection (reproduction) of the recorded address information by performing an address code process in accordance with the format described previously in FIG. 5.

The address information which is detected by the address detection circuit 36 is supplied with regard to the controller 41.

The clock generating circuit 39 generates a clock CLK in accordance with the sequence previously described.

Figure 12:
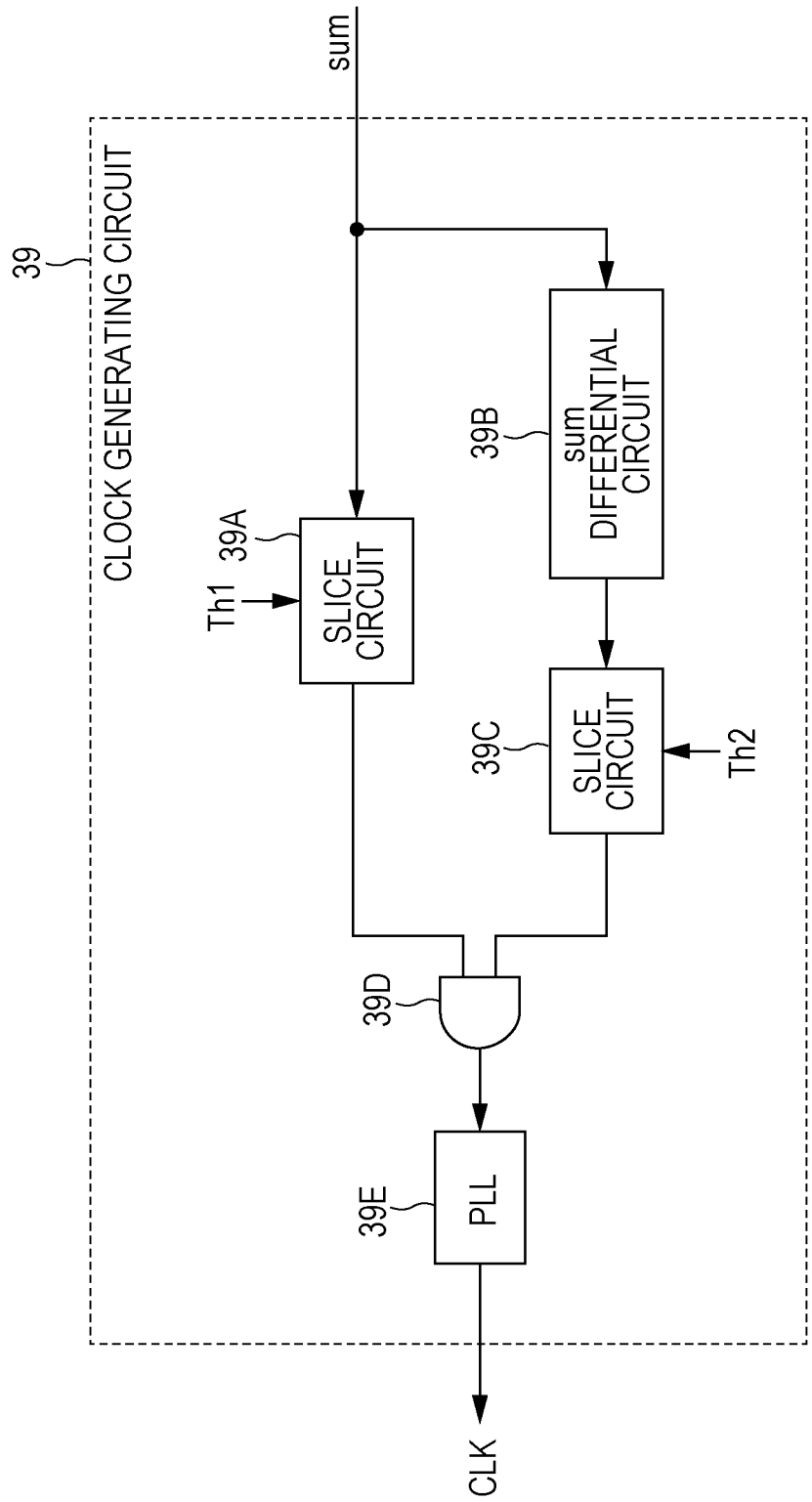
FIG. 12 is a diagram illustrating an internal configuration of a clock generating circuit.

FIG. 12 illustrates an internal configuration of the clock generating circuit 39.

In FIG. 12, a slice circuit 39A, a sum differential circuit 39B, a slice circuit 39C, an AND gate circuit 39D, and a PLL circuit 39E are provided in the clock generating circuit 39.

The sum signal is input to the slice circuit 39A and the sum differential circuit 39B as shown in the diagram. The slice circuit 39A slices the sum signal based on the set threshold Th1 and the result is output to the AND gate circuit 39D.

The sum differential circuit 39B differentiates the sum signal and generates a sum differential signal described previously. The slice circuit 39C slices the sum differential signal generated by the sum differential circuit 39B based on the set threshold Th2 and the result is output to the AND gate circuit 39D.

The AND gate circuit 39D takes an AND of the output from the slice circuit 39A and the output from the slice circuit 39C, and using this, generates the timing signal described previously.

The PLL circuit 39E generates a clock CLK by performing a PLL process with the timing signal obtained from the AND gate circuit 39D in this manner as an input signal.

Returning to FIG. 11, the clock CLK generated by the clock generating circuit 39 is supplied with regard to the selector signal generating and selecting section 40.

The selector signal generating and selecting section 40 performs generation of each of the selector signals based on the clock CLK and selector signal selection output of the selector signals (selector signals S_1, S_2, and S_Ad in the diagram) which are instructed out of the generated selector signals.

Figure 13:
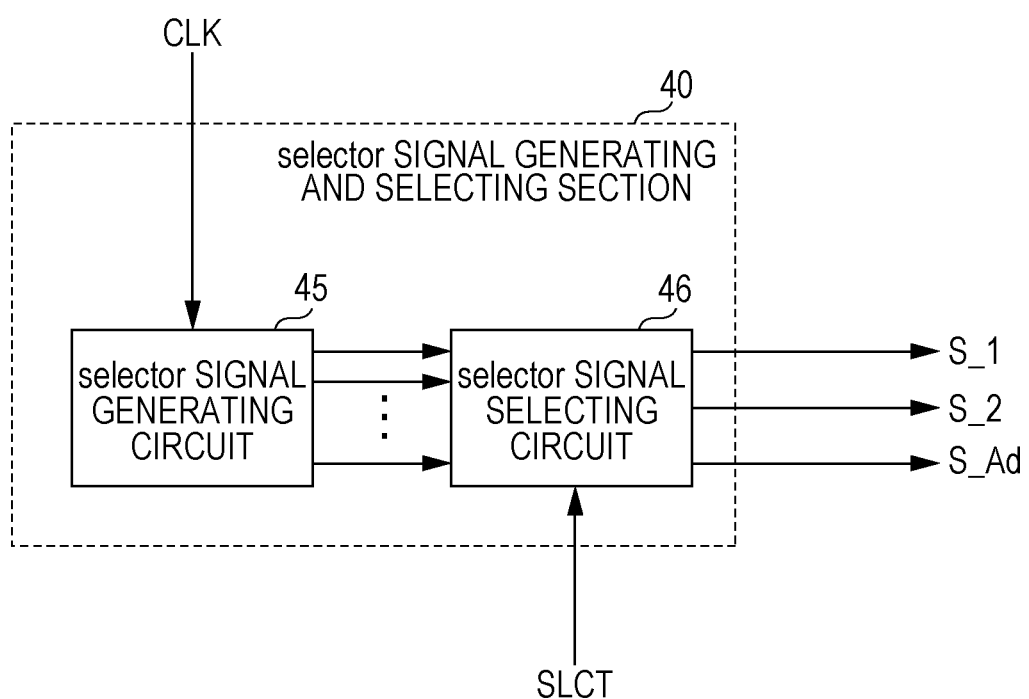
FIG. 13 is a diagram illustrating an internal configuration of the selector signal generating and selecting section which is provided in a recording device of a preceding example.

FIG. 13 illustrates an internal configuration of the selector signal generating and selecting section 40.

As shown in the diagram, a selector signal generating circuit 45 and a selector signal selecting circuit 46 are provided in the selector signal generating and selecting section 40.

The selector signal generating circuit 45 generates six types of selector signals which represent the timings of the pit formable positions of each of the pit rows A to F based on the clock CLK. Specifically, the selector signal generating circuit 45 obtains the six types of selector signals by generating signals where the phases are each deviated by ⅙ of a cycle as signals which are ⅙ of the clock CLK.

The six types of selector signals are supplied with regard to the selector signal selecting circuit 46.

The selector signal selecting circuit 46 selectively outputs, as the selector signal S_Ad, a selector signal of an instructed phase which is to be supplied with regard to the address detection circuit 36 using a selection signal SLCT from the controller 41 out of the selector signals supplied from the selector signal generating circuit 45 and selectively outputs, as the selector signal S_1 and the selector signal S_2, selector signals of an instructed phase which corresponds to each of the pit rows which have a relationship of having the same phase difference with regard to the pit row which is the servo target which is necessary in the method for generating a tracking error signal described above and which is instructed by the selection signal SLCT.

Here, as was understood also from the previous description, in the case of this example, with regard to the selector signal S_1 and the selector signal S_2, there is instruction from the controller 41 so as to output the selector signals which correspond to the pit rows which are each adjacent with regard to the pit row which is the servo target.

The selector signal S_1 which is output by the selector signal selecting circuit 46 is supplied to the sampling and holding circuit SH1 and the selector signal S_2 is supplied to the sampling and holding circuit SH2.

The sampling and holding circuit SH1 samples and holds the value of the sum signal which is supplied from the matrix circuit 35 at a timing shown by the selector signal S_1 and outputs the result to the subtracting section 37.

In addition, the sampling and holding circuit SH2 samples and holds the value of the sum signal which is supplied from the matrix circuit 35 at a timing shown by the selector signal S_2 and outputs the result to the subtracting section 37.

The subtracting section 37 obtains a tracking error signal TE-sv by subtracting the sampled and held output value using the sampling and holding circuit SH2 from the sampled and held output value using the sampling and holding circuit SH1. As is also understood from the previous description, the tracking error signal TE-sv is a signal which represents the tracking error with regard to the pit row which is selected as the servo target.

The tracking error signal TE-sv as shown in the diagram is supplied with regard to the servo light servo circuit 38 via the adding section 43 which will be described later.

The servo light servo circuit 38 generates a focus servo signal FS-sv and a tracking error signal TS-sv respectively based on the focus error signal FE-sv and the tracking error signal TE-sv (after having passed through the adding section 43).

Then, when recording, in accordance with an instruction from the controller 41, by driving each of the focus coil and the tracking coil of the biaxial actuator 21 based on a focus driving signal FD-sv and a tracking driving signal TD-sv generated based on the focus servo signal FS-sv and the tracking error signal TS-sv, focus servo control with regard to the laser light for servos and tracking servo control with a predetermined pit row as the target are realized.

The controller 41 is configured by a microcomputer which is provided with, for example, a memory (recording device) such as a CPU (Central Processing Unit), a ROM (Read Only Memory), a RAM (Random Access Memory), or the like and performs overall control of the recording and reproduction device 10 by executing controlling and processing in accordance with a program stored in the ROM or the like.

For example, the controller 41 performs controlling (setting) of the focus position of the laser light for recording and reproduction based on the value of the offset of-L which is set in advance in correspondence with each of the layer positions L as described above. Specifically, by driving the lens driving section 16 in the optical pickup OP based on the value of the offset of-L which is set in correspondence with the information recording layer position L which is the recording target, the selection of the recording position in the depth direction of the bulk layer 5 is performed.

In addition, the controller 41 also performs control for realizing servo control switching of the object lens 20 when recording and reproducing as described previously. Specifically, when recording, the controller 41 performs instructing of the outputting of the focus driving signal FD-sv and the tracking driving signal TD-sv with regard to the servo light servo circuit 38, and in addition, instructing of the stopping of the output of the focus driving signal FD-rp and the tracking driving signal TD-rp in the recording and reproduction light servo circuit 34.

On the other hand, when reproducing, instructing of the outputting of the focus driving signal FD-rp and the tracking driving signal TD-rp with regard to the recording and reproduction light servo circuit 34 and instructing of the stopping of the output of the focus driving signal FD-sv and the tracking driving signal TD-sv with regard to the servo light servo circuit 38 are performed.

In addition, the controller 41 also performs a seek operation control with regard to the servo light servo circuit 38. That is, an instruction with regard to the servo circuit 38 so as to move the spot position of the laser light for servos to a predetermined target address in the reference surface Ref and a selector signal selection instruction using the selection signal SLCT with regard to the selector signal generating and selecting section 40 (selector signal selecting circuit 46) are performed.

Here, the seek operation control in this case is performed, for example, in a sequence as below.

1) moving to the vicinity of the target address using the movement of the entire optical pickup OP which uses the slide driving section described above, 2) turning ON a focus servo of the laser light for servos, 3) generating the clock CLK and generating each of the selector signals based on the sum signal, 4) executing of tracking servo control with the arbitrary pit row as the target based on the selector signal arbitrary selected, and 5) by reading the address information (information for identifying the pit row) using the application of a tracking servo in 4), performing a pit row jump from the address until the target address.

The controller 41 performs an instruction with regard to the servo circuit 38 so that the operations of 1) and 20 are executed. In addition, the controller 41 performs a selection instruction of the selector signal S_1 and the selector signal S_2, which correspond to the phases of the pit rows which are each adjacent with regard to the pit row with the phase determined in advance, with regard to the selector signal generating and selecting section 40 using the selection signal SLCT for selecting the arbitrary selector signal in 4).

In addition, in regard to the selector signal S_Ad, the controller 41 performs a selection instruction of the selector signal which corresponds to the "pit row with the phase determined in advance" (that is, the pit row selected as the servo target) with regard to the selector signal generating and selecting section 40 in order to realize the operation of 5).

Then, in correspondence with the selector signal S_Ad which is instructed in this manner, the address information which is detected by the address detection circuit 36 is input, the number of jumps of the pit rows which is necessary until the target address is calculated based on the address information and the instruction for executing the pit row jump operation of the number of jumps is performed with regard to the servo circuit 38.

1-8. Method of Realizing Arbitrary Recording Pitch

According to the configuration of the recording and reproduction device 10 described above, it is possible to perform a tracking servo with one arbitrary pit row as the target out of the pit rows with each phase formed in the reference surface Ref.

In the preceding example, with the assumption of the configuration where a tracking servo is possible where one pit row of the reference surface Ref is tracked in this manner, realization of an arbitrary recording pitch is achieved using the method below.

Figure 14:
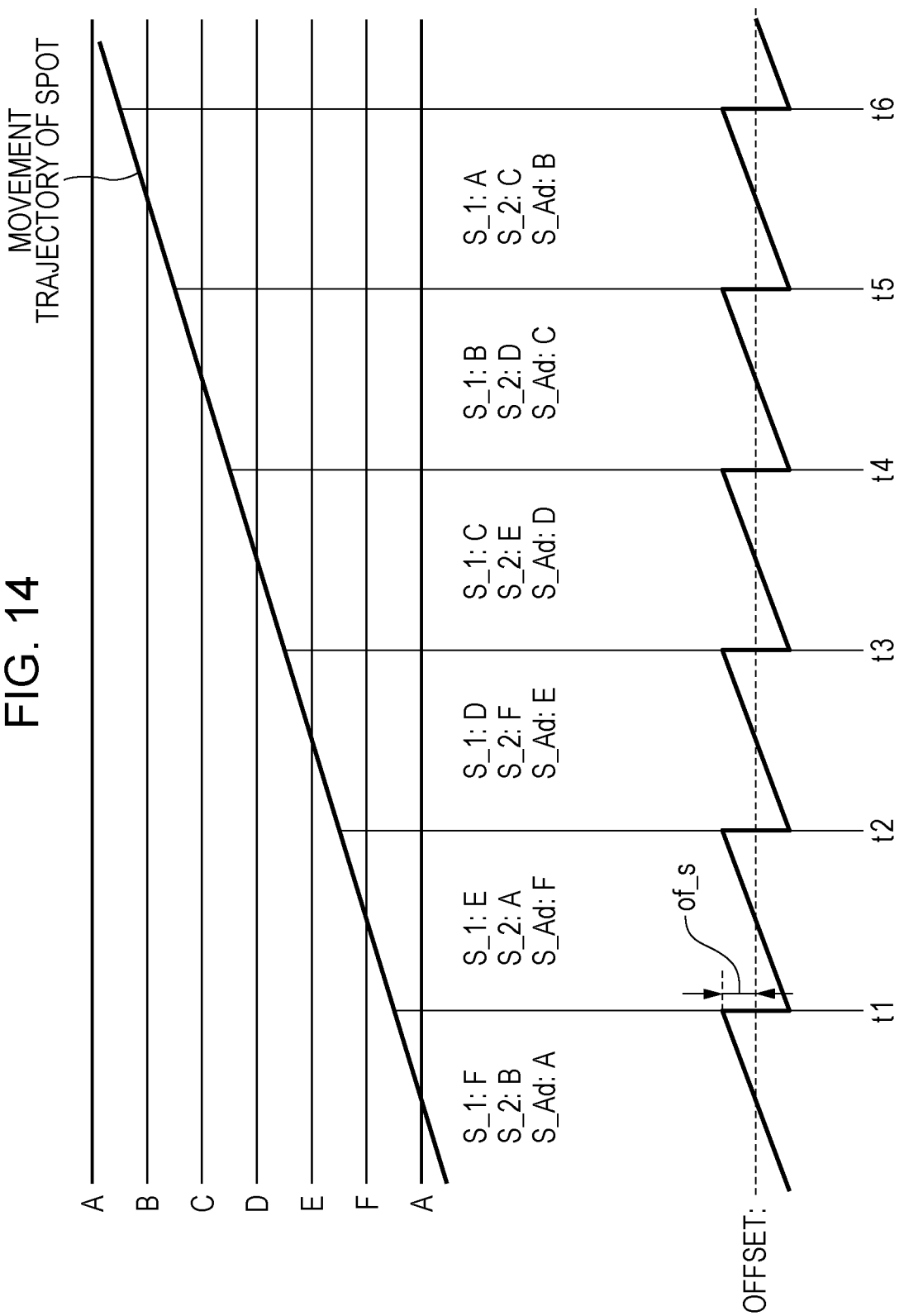
FIG. 14 is a diagram for describing a specific control method as a preceding example for realizing an arbitrary recording pitch.

FIG. 14 is a diagram for describing a specific control method as the preceding example for realizing an arbitrary recording pitch.

In FIG. 14, the relationship is shown between a waveform of an offset which is to be applied with regard to a tracking servo loop in order to realize the arbitrary recording pitch (spiral pitch), transition of the selector signal S_1 and the selector signal S_2 which are to be sequentially output in accordance with the application of the offset, and a movement trajectory of the spot position which is generated due to the sequentially switching of the servo target pit rows in accordance with the transferring of the selector signals S_1 and S_2 and application of the offset.

In addition, in FIG. 14, transition of the selector signal S_Ad which is to be sequentially switched in accordance with the movement of the spot is also shown.

Here, in order for the spot position of the laser light for servos to draw out a trajectory in a spiral shape using the arbitrary pitch on the disc, it is sufficient if the irradiation spot position which moves in accordance with the rotation of the bulk recording medium 1 spans the sequential pit rows in the radial direction. That is, by the intervals spanning between the pit rows being set in advance in accordance with the spiral pitch which is to be achieved, it is possible for the arbitrary spiral pitch to be realized.

The movement of the spot position such as this is realized by applying an offset with regard to the tracking servo loop. Specifically, in a state where the tracking servo is turned on, the spot position is gradually separated from the pit row which is the servo target by applying an offset where the value increases with the passing of time with regard to the tracking servo loop. Then, when the spot position is separated by a certain extent from the pit row which is the servo target, the servo target pit row is switched to the pit row which is adjacent on the outer circumference side and the spot position is gradually separated to the outer circumference side from the pit row which is newly switched to be the servo target by applying an offset where the value increases with the passing of time with regard to the tracking servo loop in the same manner.

By the application of the offset with regard to the tracking servo loop and the sequential switching of the servo target pit row being repeatedly performed and the spot position spanning each of the pit rows in a so-called tightrope walking manner, it is possible for the spot position to draw out a trajectory in a spiral shape on a disc with a pitch which does not depend on the pitch of the pit rows formed on the reference surface Ref. At this time, it is possible that a spiral pitch is arbitrarily set due to the setting of the inclination of the offset which is applied to the tracking servo loop.

Here, as description for confirmation, that it is possible to realise changes in the position of the spot position using the sequential switching of the servo target pit row and the application of the offset makes it possible to arrange the pit rows at a pitch which exceeds the optical limit in the radial direction with the configuration of the reference surface Ref as the configuration described in FIG. 3. That is, if the pit rows are not able to be arranged at a pitch which exceeds the optical limit in the radial direction, the tracking servo deviates in accordance with the application of the offset.

However, in a case where a method is adopted where the servo target pit row is sequentially switched in the manner described above in order to realise the arbitrary spiral pitch, it is necessary to set in advance which position between adjacent pit rows is the switching position (timing). In this example, the switching position of the servo target pit rows is set at a position which is exactly the intermediate point between the adjacent pit rows.

Here, when achieving a certain spiral pitch, which positions on the disc are where the spot position is to pass over for the realising of the spiral pitch is able to be determined in advance using a calculation from the format of the reference surface Ref. That is, as will be understood from this, the position where the spot position reaches the intermediate point between the adjacent pit rows is able to be determined in advance using a calculation.

In this example, in accordance with the position (any clock on any address block) as the intermediate point which is determined in advance using a calculation in this manner, the pit row which is the servo target is switched to the pit row adjacent to the outer circumference side of the pit row which was the target up until then.

In addition, in order to correspond to the performing of the switching of the servo target pit row at a timing where the intermediate point between the adjacent pit rows is reached in this manner, a waveform where the polarity changes at each of the intermediate points as shown in FIG. 14 is used as the offset for changing the position of the spot position in the radial direction. Here, since the offset value when the spot position is positioned in a position which is an intermediate point becomes, for example, "+ of_s" during a servo when the pit row A is the target and "− of_s" during a servo when the adjacent pit row B is the target, it is necessary to reverse the polarity of the offset at the servo target pit row switching timing which is the timing when the intermediate point is reached. From this point, the waveform of the offset which is to be applied in this case is a saw-tooth waveform as described above.

As description for confirmation, even with an offset waveform such as this, it is possible to be determined in advance using a calculation based on information on the spiral pitch which is to be realised and information on the format of the reference surface Ref.

By applying an offset using a saw-tooth wave which is determined in advance with regard to the tracking servo loop and repeatedly switching the pit row which is the tracking servo target to the pit row adjacent to the outer circumference side of the pit row which was the target up until then at each timing where the spot position reaches the predetermined position between the adjacent pit rows which is determined in advance as the intermediate point, it is possible to perform the spot position detection so as the spot position draws out a spiral shape using the arbitrary pitch on the disc.

Here, as the preceding example, the method of selecting each of the selector signals for realising the spot position control is as shown in FIG. 14. Here, in FIG. 14, an appearance is shown where the spot position passes over the pit row A→pit row F→pit row E→pit row D→pit row C→pit row B and the selector signal S_1, the selector signal S_2, and the selector signal S_Ad which are to be sequentially selected at this time are shown.

As is shown in the diagram, here, a timing which is equivalent in the intermediate point between the pit rows A-F is set as a timing t1. After that, the timings which are equivalent to the intermediate points between the pit rows F-E, the pit rows E-D, the pit rows D-C, the pit rows C-B, and the pit rows B-A are respectively set as the timings t2, t3, t4, t5, and t6.

At the stage before the timing t1, since the pit row A is the servo target, as shown in the diagram, the selector signal with the phase which corresponds to the pit row F is selected as the selector signal S_1 and the selector signal with the phase which corresponds to the pit row B is selected as the selector signal S_2. That is, with regard to the pit row A which is the servo target, the selector signals of the pit row F and the pit row B which each have an adjacent relationship thereof (and phases differences which match) are each selected.

In addition, in regard to the selector signal S_Ad, the selector signal with the phase which corresponds to the pit row A which is the servo target is selected.

Here, as is understood previously from the description of FIGS. 11 and 13, the selection instructions of the selector signals S_1, S_2, and S_Ad are performed with regard to the selector signal generating and selecting section 40 (the selector signal selecting circuit 45) by the controller 41 using the selection signal SLCT.

When the timing t1 is reached, in order to switch the servo target pit row to the pit row F, the selector signal with the phase which corresponds to the pit row E is selected as the selector signal S_1 and the selector signal with the phase which corresponds to the pit row A is selected as the selector signal S_2.

In addition, in regard to the selector signal S_Ad, the selector signal with the phase which corresponds to the pit row F is selected.

Hereinafter, in the same manner, for each of the timings to which are the switching timings, the selector signal of each of the pit rows which are adjacent to the pit row which is the servo target are selected with regard to the selector signals S_1 and S_2, and the selector signal of the pit row which is the servo target is selected with regard to the selector signal S_Ad. Specifically, as in the diagram, "S_1:D, S_2: F, S_Ad: E" at the timing t2, "S_1:C, S_2:E, S_Ad: D" at the timing t3, "S_1:B, S_2:D, S_Ad:C" at the timing t4, and "S_1:A, S_2: C, S_Ad:B" at the timing t5 are each selected.

Here, the application of the offset using the saw-tooth waveform as shown in FIG. 14 is performed by the offset generating section 42 and the adding section 43 in the recording and reproduction device 10 shown previously in FIG. 11.

The offset generating section 42 generates a saw-tooth waveform signal which has a predetermined inclination calculated in advance and outputs the signal to the adding section 43.

The adding section 43 adds the saw-tooth waveform signal which is input by the offset generating section 42 in this manner with regard to the tracking error signal TE-sv which is input from the subtracting section 37.

Here, the controller 41 performs an output stop or start instruction of the saw-tooth waveform signal with regard to the offset generating section 42.

Here, for confirmation, the position control method as the preceding example which is described above using FIG. 15 is represented in correspondence with the tracking error signals TE-sv of each of the pit rows.

Figure 15:
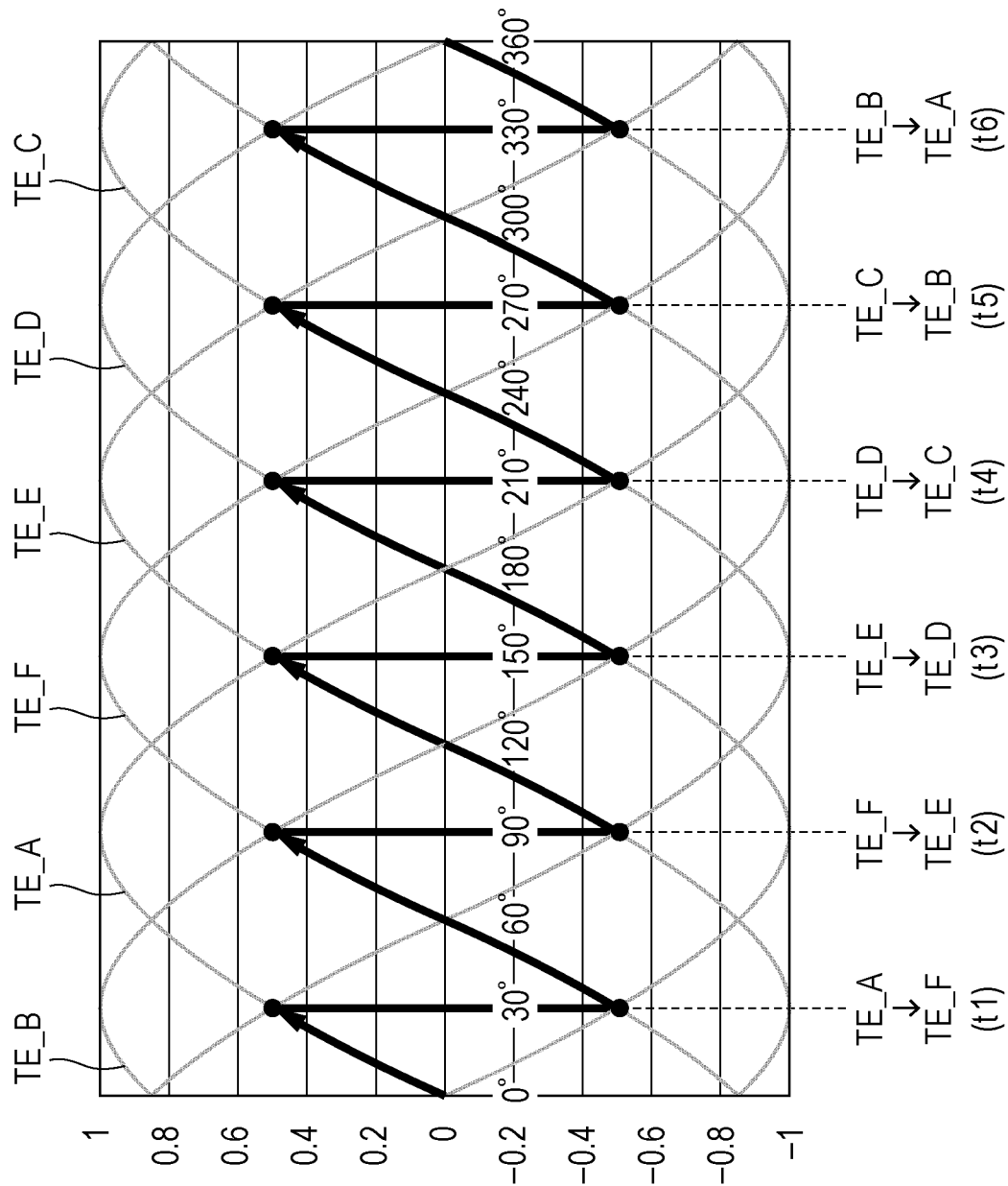
FIG. 15 is a diagram illustrating a position control method as a preceding example in relation to the tracking error signal of each pit row.

In FIG. 15, tracking error signals TE_A to TE_F represent the tracking error signals TE-sv with regard to the respective pit rows A to F. Here, the waveforms of the tracking error signals TE_A to TE_F represent waveforms when the irradiation spot position is gradually moved to the outer circumference side.

In this case, since there are six types of A to F as the phases of the pit rows, the phases of the respective tracking error signals TE (TE-sv) as shown in the diagram are in a relationship of being deviated from each other by 60°.

The position control method as the preceding example which is described above makes it possible to realize the sections in the vicinity of zero to sequentially follow in the order of the tracking error signal TE_A, TE_F, TE_E, TE_D, TE_C, TE_B, TE_A . . . as shown by the thick lines in the diagram.

2. Embodiment 2-1. Problems with Preceding Example

According to the preceding example described above, it is possible for the irradiation spot position of the laser light for servos to draw out a spiral shape with an arbitrary pitch on the disc, and as a result, an arbitrary pitch is possible in regard to the recording pitch in the bulk layer 5.

However, in the preceding example, in a case where a method is adopted where the offset is applied with regard to the tracking servo loop for spiral control and the servo target pit row is sequentially switched, it is desirable that the value of the offset which is applied with regard to the servo loop is as small as possible. That is, as is understood with reference to FIG. 15, if the value of the offset is small, to that extent, it is possible that the pit rows are spanned using a section with high linearity in the tracking error signal TE-sv, and as a result, it is possible to make the stability of the servo more reliable.

2-2. Method of Realizing Arbitrary Pitch in Embodiment

Figure 16:
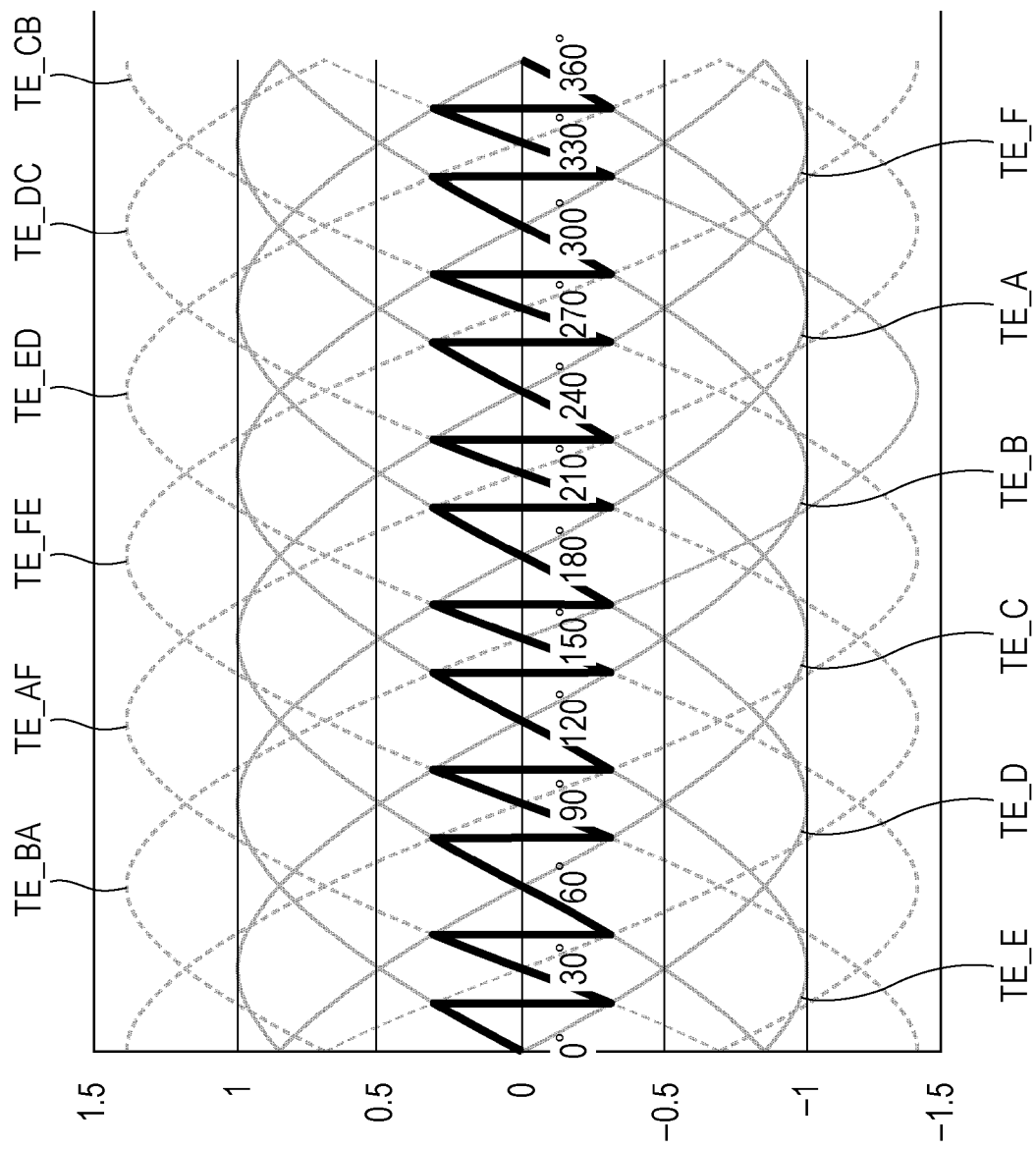
FIG. 16 is a diagram for describing a position control method as an embodiment.

Therefore, in the embodiment, as shown in FIG. 16, it is possible to generate the tracking error signals TE-sv (the tracking error signals TV-sv which corresponds to a half pitch) which corresponds to the position in the intermediate between each of the pit rows of the pit rows A to F and perform position control in the same manner as the preceding example using the tracking error signals TE-sv which corresponds to a half pitch.

Specifically, in this example, as the tracking error signals TE-sv which corresponds to a half pitch, a tracking error signal TE_AF which corresponds to an intermediate position between the pit rows A-F, a tracking error signal TE_FE which corresponds to an intermediate position between the pit rows F-E, a tracking error signal TE_ED which corresponds to an intermediate position between the pit rows E-D, a tracking error signal TE_DC which corresponds to an intermediate position between the pit rows D-C, a tracking error signal TE_CB which corresponds to an intermediate position between the pit rows C-B, and a tracking error signal TE_BA which corresponds to an intermediate position between the pit rows B-A are each generated.

Here, in the diagram, for ease of description, in order to easily distinguish the tracking error signals TE-sv (TE_A to TE_F) shown in FIG. 15, the gain of the tracking error signals TE-sv with a half pitch is changed and shown.

Here, it is possible to generate the tracking error signals TE-sv which corresponds to a half pitch using the method below.

Figure 17:
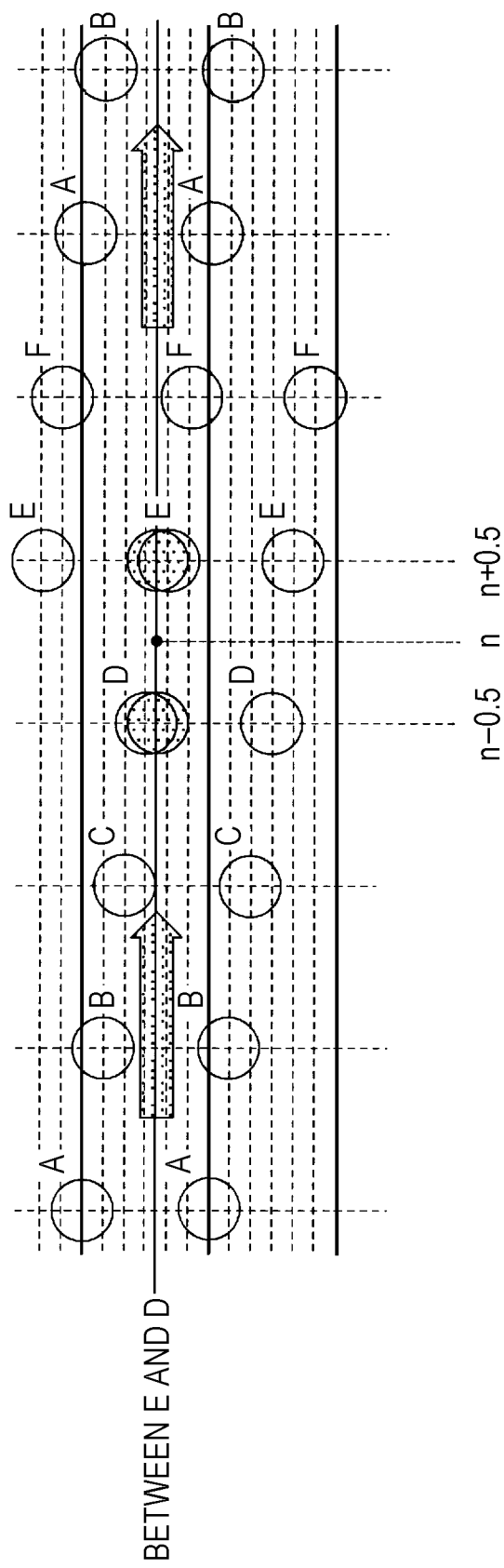
FIG. 17 is a diagram for describing a method of generating a tracking error signal corresponding to a half pitch.
Figure 18:
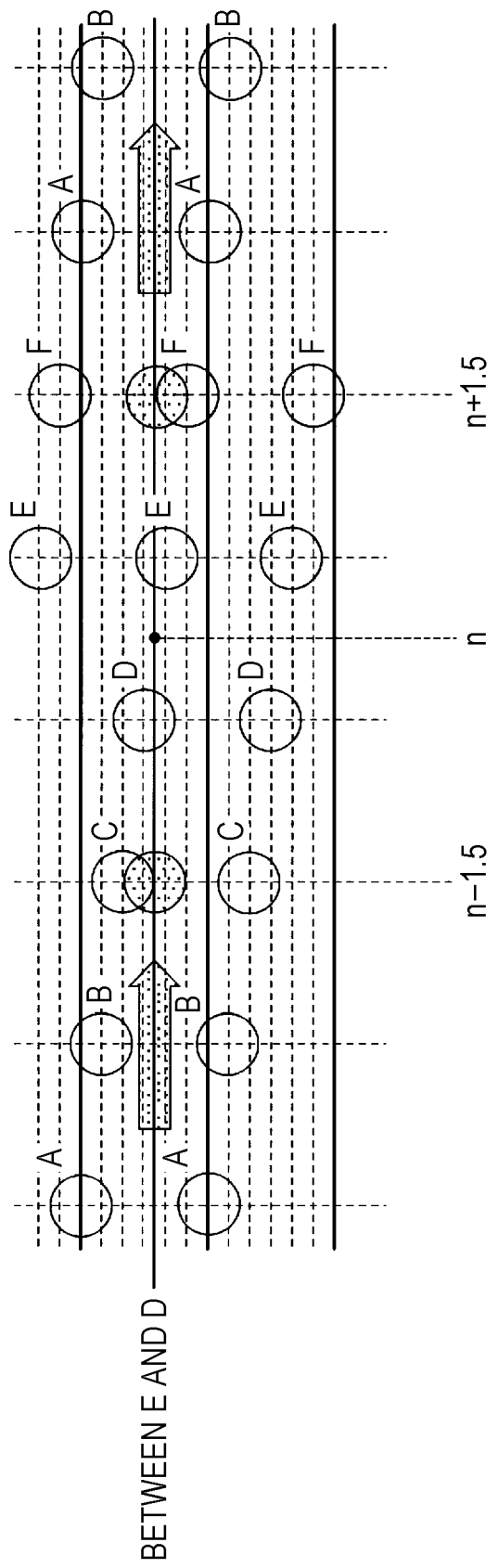
FIG. 18 is the same diagram for describing a method of generating a tracking error signal corresponding to a half pitch.

FIGS. 17 and 18 are diagrams which describing a method of generating the tracking error signals which correspond to a half pitch. In FIGS. 17 and 18, each of the pit rows A to F formed on the reference surface Ref and an appearance, where the spot of the laser light for servos is moved so as to trace on an intermediate position of the pit row D and the pit row E, are shown.

Referencing FIGS. 17 and 18, when the spot of the laser light for servo accurately traces on the intermediate position between the pit rows D-E, it is understood that the values of the sum signal are the same on the pits of the pit rows where the phase differences are each the same with regard to the intermediate position between D-E.

That is, as will be understood from this, it is possible to generate the tracking error signals TE-sv which corresponds to a half pitch using a sampled and held value of the sum signal of each of the pit rows which have a relationship where the phase differences are each the same with regard to the intermediate position with the intermediate position (intermediate phase) between predetermined pit rows as a standard. Specifically, the difference in values of the sum signals, which are sampled and held at timings which represents the pit formation positions (pit formable positions) of each of the pit rows where the phase difference is the same with regard to the intermediate position, become the tracking error signals TE-sv at the intermediate position. That is, become the tracking error signals TE-sv which are for the intermediate positions being able to be selected as the servo target.

Also using the tracking error signals TE-sv which corresponds to a half pitch, the servo target positions are alternately switched from a certain pit row→an intermediate position adjacent thereto→the pit row adjacent thereto . . . . Specifically, for example, as shown previously in FIG. 14, when referring to the transition from a state where the servo, which has the pit row A as a target, is being performed, first, the switching from the pit row A→the intermediate position AF between the pit rows A-F is performed, and after that, sequentially, the switching of the intermediate position AF→the pit row F→the intermediate position FE→the pit row E→the intermediate position ED→the pit row D→the intermediate position DC→the pit row C→the intermediate position CB→the pit row B→the intermediate position BA→the pit row A . . . is performed.

2-3. Configuration of Recording Device of Embodiment

Figure 19:
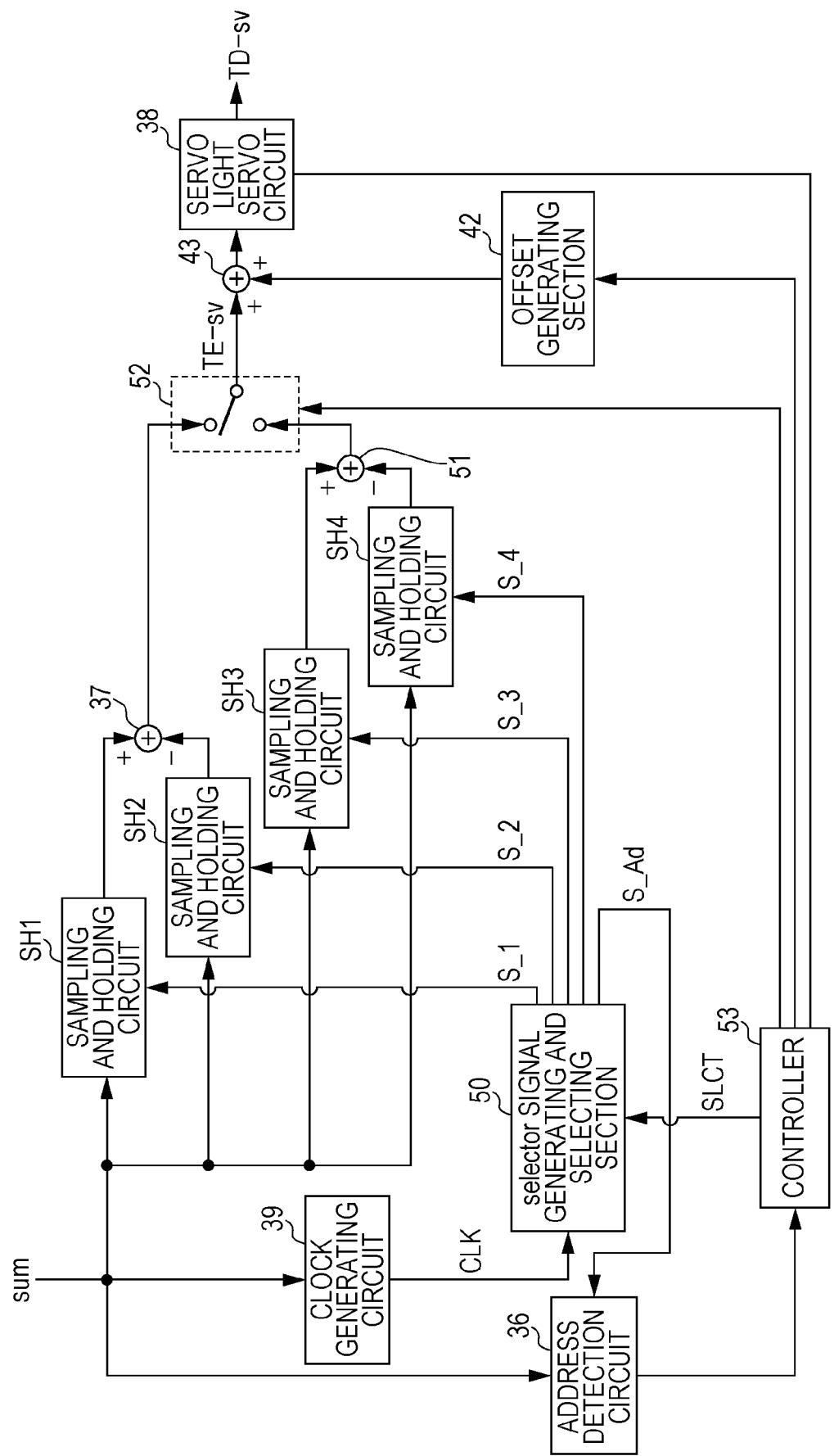
FIG. 19 is a diagram for describing an internal configuration of a recording device as an embodiment.

FIG. 19 is a diagram for describing an internal configuration of a recording device as the embodiment.

The recording device of the embodiment is where the configuration of the tracking servo control system is changed with regard to the laser light for servos in the recording and reproduction device 10 which is the preceding example. As a result, in FIG. 19, only the configuration of the tracking servo control system with regard to the laser light for servos which is provided in the recording device of the embodiment is extracted and shown, and in regard to the configuration of the optical pickup OP and the recording and reproduction system and the servo system of the laser light for recording and reproduction, the diagrammatic representation is omitted since it is the same as the case of the recording and reproduction device 10.

Here, in FIG. 19, the parts where the description has already been completed in the preceding example, the same reference numerals are applied and the description is omitted.

So as to understand by comparing FIG. 19 and FIG. 11 before, in the recording device of the embodiment, a sampling and holding circuit SH3 and a sampling and holding circuit SH4, which are for generating the tracking error signals TE-sv which corresponds to a half pitch described above, is newly added as sampling and holding circuits which sample and hold sum signals. In addition, the subtracting section 51 is added which subtracts the output of the sampling and holding circuit SH4 from the output of the sampling and holding circuit SH3.

As shown in the diagram, the output of the subtracting section 51 is input into a selector 52. In addition, in this case, the output of the subtracting section 37 is input in the selector 52. The selector 52 selects and output any one out of the output of the subtracting section 37 or the output of the subtracting section 51 due to the instruction from a controller 53 which will be described later.

The output of the selector 52 is input to the adding section 43 as the tracking error signal TE-sv.

Figure 20:
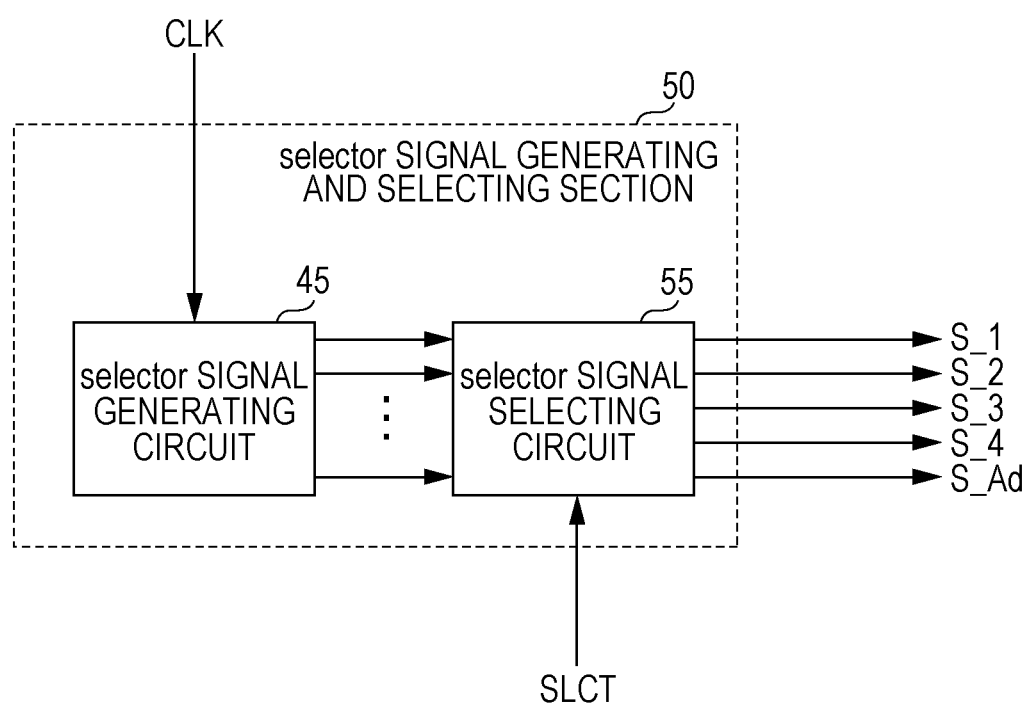
FIG. 20 is a diagram illustrating an internal configuration of the selector signal generating and selecting section which is provided in a recording device of an embodiment.

In addition, in the recording device in this case, a selector signal generating and selecting section 50 is provided instead of the selector signal generating and selecting section 40 shown in FIG. 11. FIG. 20 illustrates an internal configuration of the selector signal generating and selecting section 50, but so as to understand by comparing with FIG. 13 before, the selector signal generating and selecting section 50 is different in the point that a selector signal selecting section 55 is provided instead of the selector signal selecting circuit 46.

The selector signal selecting section 55 is the same as the case of the preceding example in the point that the selector signal S_1 is output with regard to the sampling and holding circuit SH1, the selector signal S_2 is output with regard to the sampling and holding circuit SH2, and the selector signal S_Ad is output with regard to the address detection circuit 36, but in this case, furthermore, there is a difference in a point where there is the configuration so that a selector signal S_3 is output with regard to the sampling and holding circuit SH3 and a selector signal S_4 is output with regard to the sampling and holding circuit SH4.

The selector signal selecting section 55 selects and outputs signals, which are each instructed by the controller 53 using the selection signal SLCT from the selector signals with each of the phases which are generated by the selector signal generating section 45, as the selector signals S_1, S_2, S_3, S_4, and S_Ad.

The controller 53 is configured, for example, by a microcomputer in the same manner as the controller 41 before and performs overall control of the recording device.

The controller 53 in this case is different in the point that the selector signal S_3 and the selector signal S_4 is selected and instructed using the selection signal SLCT and switching control of the output of the selector 52 is performed as the process for realizing the arbitrary recording pitch using the tracking error signals TE-sv which corresponds to a half pitch.

Here, a specific relationship between selection of the selector signals S_1, S_2, S_3, S_4, and S_Ad which is to be performed in the case of the embodiment and the offset applied to the tracking servo loop will be described with reference to FIG. 21.

Figure 21:
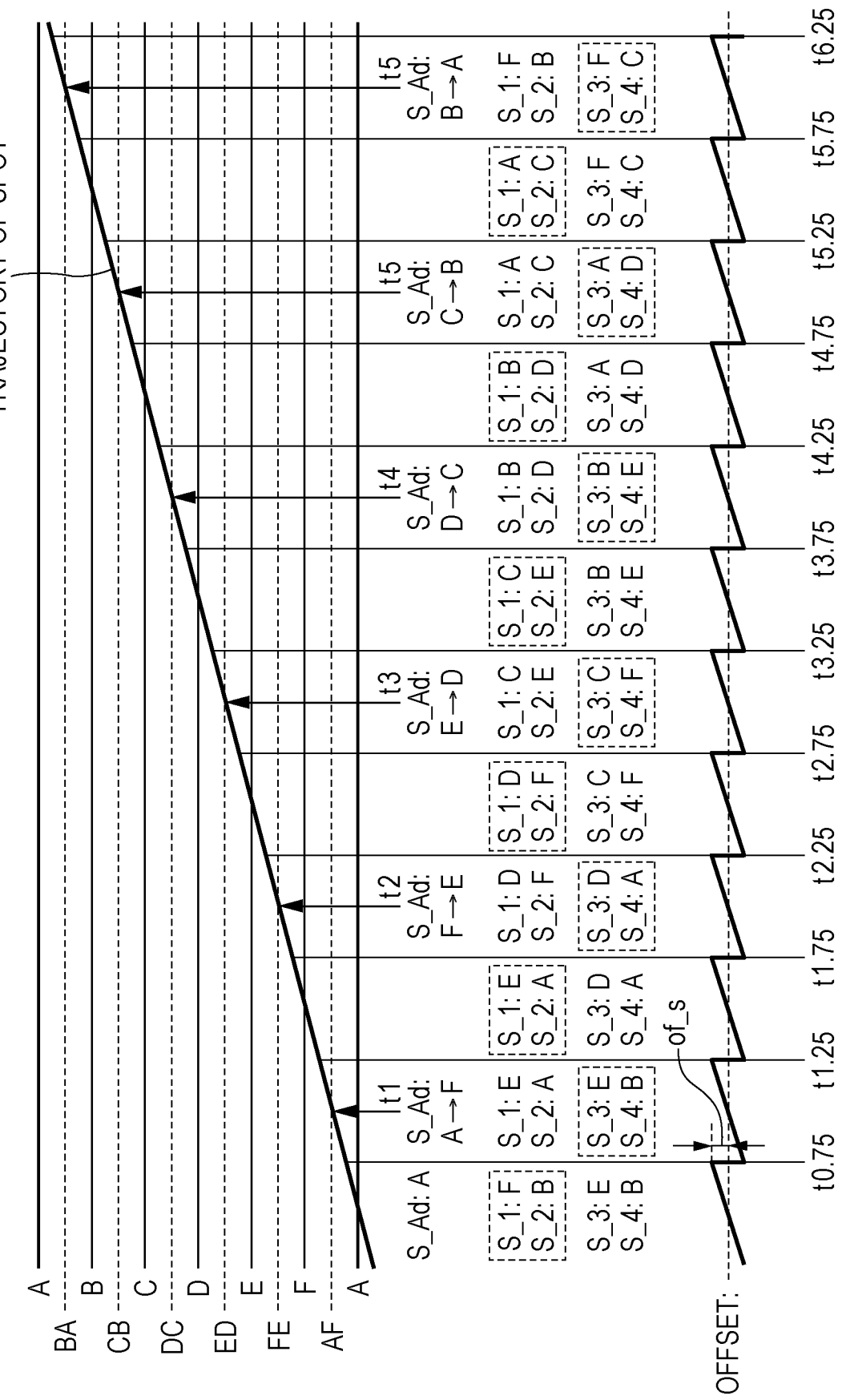
FIG. 21 is a diagram for describing a specific control method as an embodiment for realizing an arbitrary recording pitch.

First, in FIG. 21, in the same manner as the case of FIG. 14 before, the timings, when the intermediate points (intermediate positions) between each of the pit rows is reached, are represented as timings t1 to t6.

Here, in this example, the timing, where performing of the switching between the servo state which targets a pit row and the servo state which targets an intermediate position, is set at a timing of the intermediate point between the pit row and the intermediate position. That is, for example, the timing when the servo target position is switched from the pit row A to the intermediate position AF is the timing of the intermediate point between the pit row A and the intermediate position AF.

As a result, in FIG. 21, the timing of the switching of the pit row A→the intermediate position AF is written as a timing t0.75, and the timings of the respective switchings of the intermediate position AF→the pit row F, the pit row F→the intermediate position FE, the intermediate position FE→the pit row E, the pit row E→the intermediate position ED, the intermediate position ED→the pit row D, the pit row D→the intermediate position DC, the intermediate position DC→the pit row C, the pit row C→the intermediate position CB, the intermediate position CB→the pit row B, the pit row B→the intermediate position BA, the intermediate position BA→the pit row A are respectively written as t1.25, t1.75, t2.25, t2.75, t3.25, t3.75, t4.25, t4.75, t5.25, t5.75, and t6.25.

Here, if the intermediate point between the pit rows and the intermediate position is set as the timing of the switching of the servo target position as described above, it is possible to minimize the largest value of the offset which is to be applied in order to change the position of the spot position in the radial direction.

Since the intermediate point between the pit rows and the intermediate position is set as the timing of the switching of the servo target position in this manner, even with the wave form of the offset which is applied with regard to the tracking servo loop in this example, the polarity is reversed for each timing of the intermediate point of the pit row and the intermediate position as in the diagram.

That is, the offset generating section 42 in this case is configured to output the saw tooth waveform signal where the polarity is reversed for each timing of the intermediate point of the pit row and the intermediate position in this manner.

Here, it is possible to calculate the timing of the intermediate point of the pit row and the intermediate position from information on the spiral pitch which is to be realized and information on the format of the reference surface Ref.

Then, in the case of the embodiment, the switching is performed as below with regard to the selector signal S_1, S_2, S_3, S_4, and S_Ad while application of the offset is performed. Here, as is understood from the previous description, the selection instruction of the selector signal is performed by the controller 53 supplying the selection signal SLCT with regard to the selector signal generating and selecting section 50.

First, with regard to the selector signal S_Ad, also in this case, the switching is performed in the same manner at a timing in the same manner as the preceding example. That is, at the timing t1 where the irradiation spot reaches the intermediate point (that is, the intermediate position AF) of the pit row A and the pit row F, the switching from the selector signal with regard to the pit row A to the selector signal with regard to the pit row F is performed.

Hereinafter, the selection and switching of the selector signal S_Ad is performed so that F→E at the timing t2 when the intermediate position FE is reached, E→D at the timing t3 when the intermediate position ED is reached, D→C at the timing t4 when the intermediate position DC is reached, C→B at the timing t5 when the intermediate position CB is reached, and B→A at the timing t6 when the intermediate position BA is reached.

In addition, with regard to the selector signal S_1 and the selector signal S_2, as in the diagram, "S_1:F, S_2 B" is selected and output until the timing t0.75 (intermediate point of the pit row A and the intermediate position AF) is reached, and "S_1:E, S_2 A" is selected and output from the timing t0.75 until the timing t1.75 (intermediate point of the pit row F and the intermediate position FE).

Hereinafter, "S_1:D, S_2 F" is selected and output from the timing t1.75 until the timing t2.75 (intermediate point of the pit row E and the intermediate position ED), "S_1:C, S_2 E" is selected and output from the timing t2.75 until the timing t3.75 (intermediate point of the pit row D and the intermediate position DC), "S_1:B, S_2 D" is selected and output from the timing t3.75 until the timing t4.75 (intermediate point of the pit row C and the intermediate position CB), "S_1:A, S_2 C" is selected and output from the timing t4.75 until the timing t4.75 (intermediate point of the pit row B and the intermediate position BA), and "S_1:F, S_2 B" is selected and output after the timing t5.75 (intermediate point of the pit row A and the intermediate position AF).

In addition, in regard to the selector signal S_3 and the selector signal S_4 which are on the half pitch side, selection and output are performed as below.

First, as is understood from the previous description, in the generation of the tracking error signals TE-sv which correspond to a half pitch, the selector signals of the pit rows, which each have the same phase difference with regard to the intermediate position which is the servo target, are selected as the selector signal S_3 and the selector signal S_4. Here, as an example, with regard to the selector signals of the pit rows which have the same phase difference, there is an example where the selector signals of each of the pit rows, which have a phase difference of 1.5 times the pit row with regard to the intermediate position which is the servo target as shown in FIG. 18, are selected.

In FIG. 21, first, "S_3:E, S_4:B" is selected and output until the timing t1.25 (intermediate point of the intermediate position AF and pit row F) is reached with regard to the selector signal S_3 and the selector signal S_4 in this case.

Then, "S_3:D, S_4:A" is selected and output from the timing t1.25 until the timing t2.25 (intermediate point of the intermediate position FE and pit row E). Hereinafter, "S_3:C, S_4:F" is selected and output from the timing t2.25 until the timing t3.25 (intermediate point of the intermediate position ED and pit row D), "S_3:B, S_4:E" is selected and output from the timing t3.25 until the timing t4.25 (intermediate point of the intermediate position DC and pit row C), "S_3:A, S_4:D" is selected and output from the timing t4.25 until the timing t5.25 (intermediate point of the intermediate position CB and pit row B), and "S_3:F, S_4:C" is selected and output from the timing t5.25 until the timing t6.25 (intermediate point of the intermediate position BA and pit row A).

Then, in this example, the switching control of the selector 52 is performed under the performing of the sequential switching of the selector signal in this manner and the application of the offset described above. Specifically, shown within the dashed lines in the diagram, the tracking error signal TE-sv (that is, the output of the subtracting section 37 in FIG. 19) which is generated using the selector signal S_1 and S_2 is selected and output until the timing t0.75, and the tracking error signal TE-sv (the output of the subtracting section 51) which is generated using the selector signal S_3 and S_4 is selected and output from the timing t0.75 until the timing t1.25.

Hereinafter, in the same manner, the output of the subtracting section 37 and the output of the subtracting section 51 are alternately switched using the selector 52 at each timing when the intermediate point of the pit row and the intermediate position which are in an adjacent relationship is reached which is the timings t1.25, t1.75, t2.25, t2.75, t3.25, t3.75, t4.25, t4.75, t5.25, t5.75, and t6.25.

By the switching control of the output of the selector 52 sequentially switching (selecting) and repeating the selector signal described above in this manner, the signal which targets the pit row A, the intermediate position AF, the pit row F, the intermediate position FE, the pit row E, the intermediate position ED, the pit row D, the intermediate position DC, the pit row C, the intermediate position CB, the pit row B, the intermediate position BA, the pit row A . . . are sequentially switched and output as the tracking error signals TE-sv, and as a result, the tracking servo which sequentially targets the pit rows and the intermediate positions is performed and the spot position control (control for drawing out a spiral using the arbitrary pitch) is performed where the spot position gradually moves to the outer circumference side in accordance with the application of the offset as described above.

Here, as is understood from the description above, in this example, not only the grouping of SH1 and SH2 but the grouping of SH3 and SH4 are provided as the sampling and holding circuits SH. Then, as is understood from the method of selecting the selector signals S_1 to S_4 described above, in this example, in regard to the selector signals S_1 and S_2 which are input into the sampling and holding circuits SH1 and SH2 (that is, the sector signals which are to be selected in the generation of the tracking error signals TE-sv for when the pit rows are the servo targets), the selector signals are selected in advance with regard to the pit rows which are determined for selection as the next servo target in accordance with the switching of the pit row→the intermediate position. In the same manner, in regard to the selector signals S_3 and S_4 which are input into the sampling and holding circuits SH3 and SH4 (that is, the sector signals which are to be selected in the generation of the tracking error signals TE-sv for when the intermediate positions are the servo targets), the selector signals are selected in advance with regard to the intermediate positions which are determined for selection as the next servo target in accordance with the switching of the intermediate position→the pit row.

In this manner, in the side (SH1, SH2, and the subtracting section 37) which generates the tracking error signals TE-sv for when the pit rows are the servo targets, it is possible to start the sampling and holding of the sum signals with regard to the pit rows which are to the next servo targets in advance in a period when the intermediate positions are selected as the servo targets. In the same manner, in the side (SH3, SH4, and the subtracting section 51) which generates the tracking error signals TE-sv for the intermediate positions which are the servo targets, it is possible to start the sampling and holding of the sum signals with regard to the intermediate positions which are to the next servo targets in advance in a period when the pit rows are selected as the servo targets.

That is, it is possible to avoid having to start the sampling and holding of the sum signals and then immediately output the signals in accordance with the switching of the servo target positions, and as a result, it is possible to achieve an improvement in the stability of the tracking servo.

Here, of course, the description above does not negate the configuration where there is only one grouping of the sampling and holding circuits SH1 and SH2 and the subtracting section 37 to generate and divide the tracking error signals TE-sv. In a case of only one grouping of the sampling and holding circuits SH1 and SH2 and the subtracting section 37, it is sufficient if, in regard to the portions within the dashed lines in FIG. 21, S_3 is replaced by the selector signal S_1 which is supplied to the sampling and holding circuit SH1 and S_4 is replaced by the selector signal S_2 which is supplied to the sampling and holding circuit SH2, and S_1 and S_2 are sequentially switched in the same order as the portions within the dashed lines.

According to the embodiment described above, using the spot position control which also uses the tracking error signals TE-sv which correspond to a half pitch, it is possible to reduce the largest value of the offset which is to be applied with regard to the servo loop compared to the case of the preceding example. Specifically, it is possible to be halved.

By reducing the largest value of the offset which is to be applied with regard to the servo loop in this manner, it is possible to use a sector with high linearity in the tracking error signal TE-sv, and as a result, improvement in the stability of the servo control is possible. Also, it is possible to achieve improvement in the stability of the position control for drawing out a spiral using the arbitrary pitch.

3. Modified Examples

Above, the embodiments of the disclosure have been described but the disclosure is not limited to the specific examples described up until here.

For example, in the description up until here, since it is assumed that the recording progressed from the inner circumference→the outer circumference in the recording layer as the bulk layer 5, the alternating selection of the pit row and the intermediate position is performed along the outer circumference direction side, but in a case where the recording progressed from the outer circumference→the inner circumference, in contrast, the alternating selection of the pit row and the intermediate position may be performed along the inner circumference direction side.

In addition, in the description up until here, an example is described of a configuration where the light source of the laser light for performing recording with regard to the recording layer and the light source of the laser light for performing information reproduction and tracking and focus servos using the reflected light from the mark rows recorded in the recording layer are the same, but it is possible to have a configuration where the light source of the laser light for recording and the light source of the laser light for information reproduction and servo control are provided separately.

In addition, although not mentioned in the description up until here, in this example, the pit row is recorded in the reference surface Ref using the CAV method, and in accordance with this, the bulk recording medium 1 is rotationally driven at a constant rotation speed, so that in the recording layer in this case, the recording density is sparser toward the outer circumference side. As a measure to counter this, for example, it is possible to add a configuration for a constant recording density (or for a state where it is possible to seem as if the recording density is constant) such as continuously changing the recording clock frequency in accordance with the radial position.

In addition, in the description up until here, an example is described of a case where the pit row in the reference surface Ref is formed in a spiral shape, but it is possible to be formed in a concentric shape. Also in the case where the pit row is formed in a concentric shape, the description in the embodiment in regard to the position control method for drawing out a spiral with the arbitrary position may be the same.

In addition, in the description up until here, as the plurality of pit rows which have the pit row phases which are each different, a total of six of A to F are set and the pit row using the six patterns (pit row phases) are repeatedly formed in the radial direction, but the number of the plurality of pit rows is not limited to six and it is possible to have a larger number or a smaller number of pit rows.

In addition, an example is described of a case where the sector length of each of the pit formable positions in the pit rows is set as a sector length of 3T and the intervals between edges of each of the pit formable positions in the pit row formation direction is set to a length of 3T in the same manner (that is, n is set to be 6T), but this is only one example. The sector length of each of the pit formable positions and the intervals between edges of each of the pit formable positions in the pit row formation direction may be set so that conditions 1 and 2 described previously are satisfied.

In addition, in the description up until here, in relation to the plurality of pit rows which have pit row phases which are each different, the pit rows are arranged so that the pit row phase is progressed on the outer circumference side and the pit row phase is lagged on the inner circumference side, but it is possible that the arrangement pattern of the plurality of pit rows is set to various patterns under the condition that the optical limit is not surpassed in the pit formation direction such as, for example, in contrast, the pit rows being arranged so that the pit row phase is progressed on the inner circumference side and the pit row phase is lagged on the outer circumference side.

Figure 22:
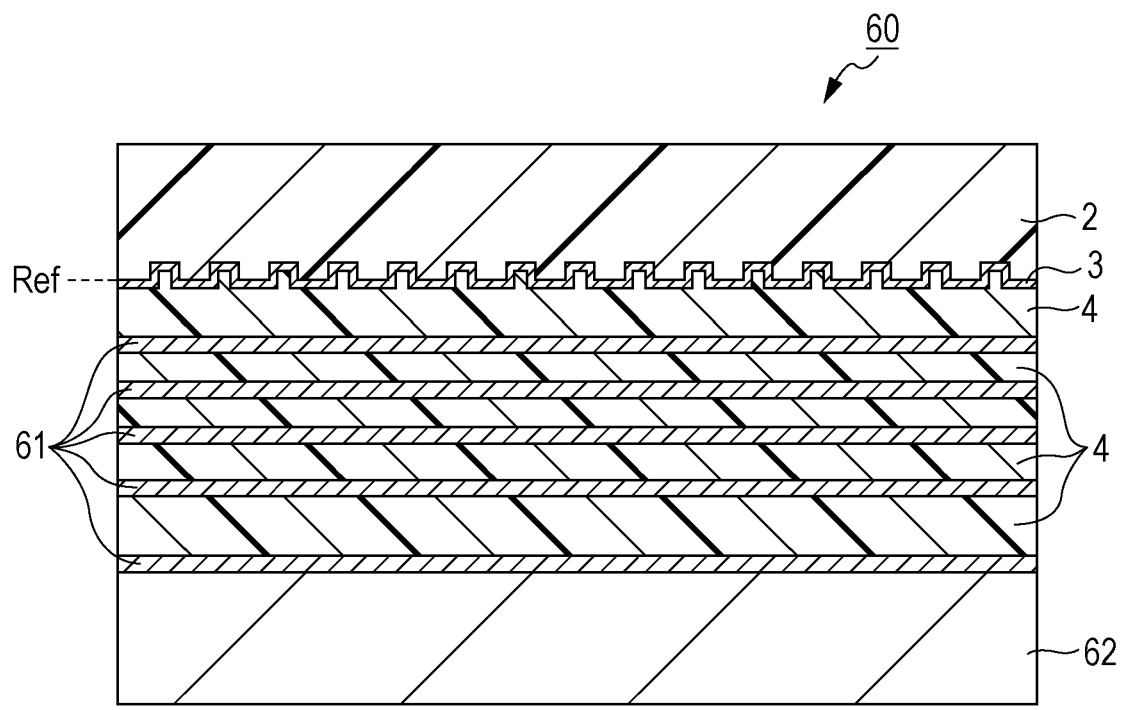
FIG. 22 is a diagram illustrating a cross-sectional configuration of an optical recording medium as a modified example.
Figure 23:
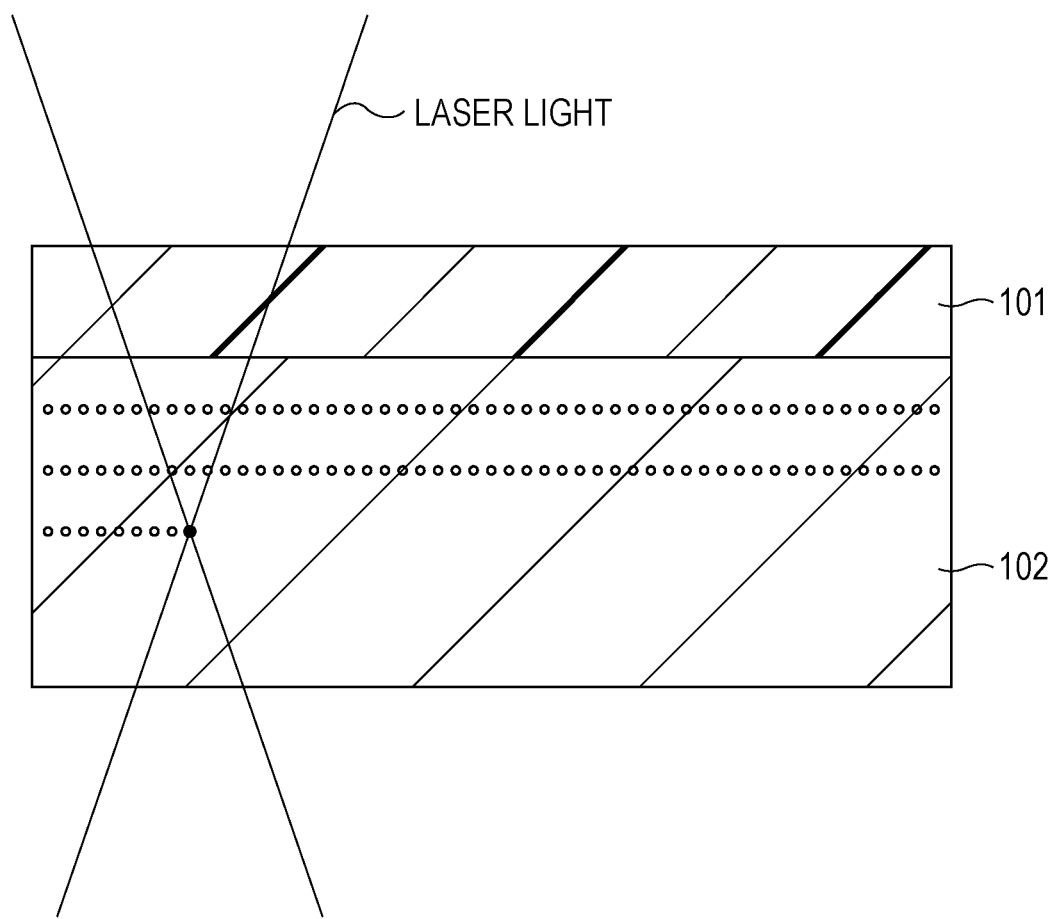
FIG. 23 is a diagram for describing a bulk recording method.
Figure 24:
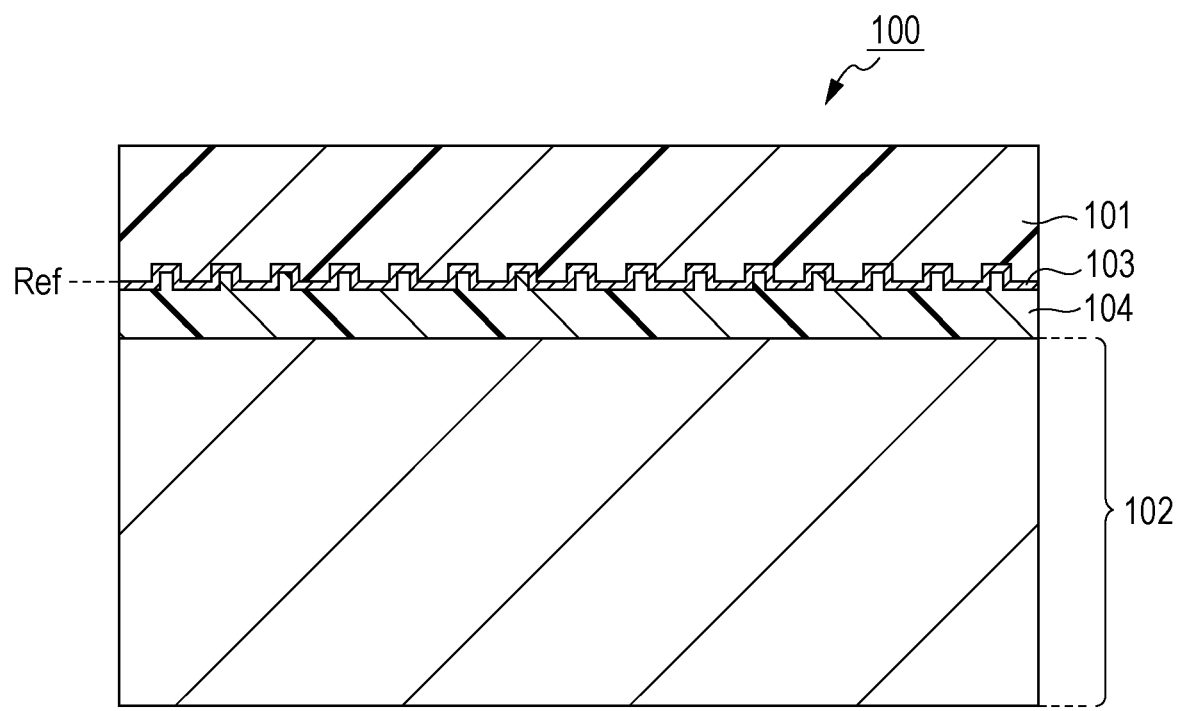
FIG. 24 is a diagram illustrating a cross-sectional configuration of an actual bulk recording medium where a reference surface is provided.

In addition, in the description up until here, an example is described of a case where the optical recording medium which is the recording target in the disclosure is the bulk type of optical recording medium, but the disclosure is able to be appropriately applied with regard to, for example, an optical recording medium (which is a multi-layer recording medium 60) which is provided with, not the bulk layer 5, but a recording layer which has multiple layers where a plurality of recording layers are formed such as is shown in FIG. 22.

In FIG. 22, the multi-layer recording medium 60 is the same as the bulk recording medium 1 shown in FIG. 1 in the point in that the cover layer 2, the selective reflecting film 3, and the intermediate layer 4 are formed in order from the upper layer side, but in this case, instead of the bulk layer 5, recording layers are laminated to have a layer configuration where a semi-transmissive recording film 61 and the intermediate layer 4 are repeatedly laminated a predetermined number of time as shown in the diagram. As shown in the diagram, the semi-transmissive recording film 61 which is formed on the lowest layer is laminated on a substrate 62. Here, in the recording film which is formed on the lowest layer, it is possible to use a fully reflecting recording film.

Here, it is necessary to pay attention to the point that the position guidance element according to the formation of the pit row is not formed in the semi-transmissive recording film 61. That is, even with the multi-layer recording medium 60, the position guidance element in a spiral shape or in a concentric shape is formed in regard to only one layer position as the reference surface Ref.

In the recording layer of the multi-layer recording medium 60, it is possible to perform focus control using the reflected light of the laser light for recording and reproduction even when recording since the semi-transmissive recording film 61 which functions as a reflecting film is formed.

That is, when recording in this case, the focus servo control with regard to the laser light for recording and reproduction is performed by focusing on the semi-transmissive recording film 61 which is the recording target using the driving of the movable lens 15 (the lens driving section 16) based on the reflected light of the laser light for recording and reproduction.

Here, a specific method of focus servos and tracking servos when reproducing may be the same as in the case where the bulk recording medium 1 is the target.

In addition, in the description up until here, the reference surface is provided with regard to the upper layer side of the recording layer, but it is possible for the reference surface to be provided on the lower layer side of the recording layer.

In addition, in the description up until here, an example is described of a case where the disclosure is applied to a recording and reproduction device which performs both recording and reproduction with regard to an optical recording medium (recording layer), but the disclosure is able to be appropriately applied to a dedicated recording device (recording device) where only recording is possible with regard to an optical recording medium (recording layer).

The present disclosure contains subject matter related to that disclosed in Japanese Priority Patent Application JP 2010-239472 filed in the Japan Patent Office on Oct. 26, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording device comprising:
a light irradiating and light receiving unit configured, in regard to an optical recording medium comprising a reference surface and a recording layer formed at a depth position different from the reference surface, wherein a pit row where intervals of pit formable positions in one circumference are limited to a first interval is formed in a spiral shape or a concentric shape in the reference surface, and which has a plurality of pit row phases by intervals of the pit formable positions in a pit row formation direction being set in a position which is each deviated by a predetermined second interval in the pit row which are arranged in the radial direction, to irradiate via a common object lens a first light as recording light with regard to the recording layer and a second light for obtaining reflected light from the reference surface and configured to receive reflected light of the second light from the reference surface;
a tracking mechanism unit configured to change a position of the object lens in a the radial direction;
a clock generating unit configured to generate a clock in accordance with the interval of the pit formable positions based at least in part on a light reception signal obtained by the light irradiating and light receiving unit receiving reflected light of the second light;
a timing selection signal generating unit configured to generate a plurality of timing selection signals, which respectively represent timings of the pit formable positions in regard to the pit rows of each phase formed in the optical recording medium, based at least in part on the clock generated by the clock generating unit;
a tracking error signal generating unit configured, when a pit row selected to be a target of a tracking servo out of the pit rows of each phase formed in the reference surface is a target pit row, and an intermediate position selected to be a target of a tracking servo out of the respective intermediate positions of the pit rows of each phase formed in the reference surface is a target intermediate position, to execute:

generation of a first tracking error signal, which represents a positional error in the radial direction with regard to the target pit row in the irradiation spot position of the second light, by:
  selecting timing selection signals that respectively correspond to two pit rows where a phase difference with regard to the target pit row each have the same relationship, from the plurality of timing selection signals as the timing selection signal for pit row selection,
  sampling and holding a value of the light reception signal in regard to the respective timings which represent the timing selection signals for pit row selection, and
  calculating a difference in the value which is sampled and held, and
generation of a second tracking error signal, which represents a positional error in the radial direction with regard to the target intermediate position in the irradiation spot position of the second light, by:
  selecting timing selection signals, which respectively correspond to two pit rows where a phase difference with regard to the target intermediate position each have the same relationship, from the plurality of timing selection signals as the timing selection signal for pit row in-between position selection,
  sampling and holding a value of the light reception signal in regard to the respective timings that represent the timing selection signals for pit row in-between position selection
  holding a value of the light reception signal in regard to the respective timings that represent the timing selection signals for pit row in-between position selection, and
  calculating a difference in the value which is sampled and held;
a tracking servo control unit configured to perform tracking servo control with regard to the object lens by controlling the tracking mechanism unit based at least in part on the tracking error signal output by the tracking error signal generating unit;
an offset applying unit configured to perform application of an offset using a saw-tooth wave with regard to a tracking servo loop which includes the tracking servo control unit; and
a control unit configured to control output using the tracking error signal generating unit to alternately switch between the first tracking error signal and the second tracking error signal at a timing in accordance with a polarity reversion timing of the offset using the saw-tooth wave.

2. The recording device according to claim 1, wherein the tracking error signal generating unit comprises:
  a first sampling and holding unit and a second sampling and holding unit that input the timing selection signal for pit row selection,
  a first subtracting unit that calculates a difference of values which are sampled and held by the first and the second sampling and holding units and obtains the first tracking error signal,
  a third sampling and holding unit and a fourth sampling and holding unit that input the timing selection signal for pit row in-between position selection,
  a second subtracting unit that calculates a difference of values which are sampled and held by the third and the fourth sampling and holding units and obtains the second tracking error signal, and
  a selection and output unit which selects and outputs the output of the first subtracting unit and the output of the second subtracting unit, and
  the control section is configured to perform output switching control using the selection and output unit at a timing in accordance with a polarity reversion timing of the offset using the saw-tooth wave.

3. The recording device according to claim 1,
wherein position information is recorded in the reference surface on the optical recording medium for each individual pit row as a pattern of forming or non-forming pits in the pit formable positions on each individual pit row, and
a position information detection unit is provided which detects the position information based at least in part on a result of performing a determination of a channel bit value as the forming or non-forming of the pits in the pit formable positions by sampling a value of the light reception signal at a timing that represents the timing selection signal which is selected from the plurality of timing selection signals.

4. The recording device according to claim 1,
wherein the light irradiating and light receiving is configured to irradiate the first light and the second light with regard to the optical recording medium which has a recording layer in a bulk state as the recording layer.

5. The recording device according to claim 1,
wherein the light irradiating and light receiving unit is configured to irradiate the first light and the second light with regard to the optical recording medium which has a recording layer with a multi-layer configuration where recording films are formed in a plurality of positions in the depth direction as the recording layer.

6. A spot position control method of a recording device that has a light irradiating and light receiving unit configured, in regard to an optical recording medium, comprising a reference surface and a recording layer formed at a depth position different from the reference surface, where a pit row where intervals of pit formable positions in one circumference is limited to a first interval is formed in a spiral shape or a concentric shape in the reference surface, and which has a plurality of pit row phases by intervals of the pit formable positions in a pit row formation direction being set in a position which is each deviated by a predetermined second interval in the pit row which are arranged in the radial direction, to irradiate via a common object lens a first light as recording light with regard to the recording layer and a second light for obtaining reflected light from the reference surface and configured to receive reflected light of the second light from the reference surface and a tracking mechanism unit which changes the position of the object lens in the radial direction, the method comprising:
  generating a clock in accordance with the interval of the pit formable positions based at least in part on a light reception signal obtained by the light irradiating and light receiving unit receiving reflected light of the second light;
  generating a plurality of timing selection signals, which respectively represent timings of the pit formable positions in regard to the pit rows of each phase formed in the optical recording medium, based at least in part on the clock generated by the clock generating unit;
  generating, when a pit row selected to be a target of a tracking servo out of the pit rows of each phase formed in the reference surface is a target pit row, and an intermediate position selected to be a target of a tracking servo out of the respective intermediate positions of the pit rows of each phase formed in the reference surface is a target intermediate position:

a first tracking error signal that represents a positional error in the radial direction with regard to the target pit row in the irradiation spot position of the second light by selecting timing selection signals, which respectively correspond to two pit rows where the phase difference with regard to the target pit row each have the same relationship, from the plurality of timing selection signals as the timing selection signal for pit row selection, sampling and holding a value of the light reception signal in regard to the respective timings which represent the timing selection signals for pit row selection, and calculating a difference in the value which is sampled and held, and a second tracking error signal that represents a positional error in the radial direction with regard to the target intermediate position in the irradiation spot position of the second light by selecting timing selection signals, which respectively correspond to two pit rows where the phase difference with regard to the target intermediate position each have the same relationship, from the plurality of timing selection signals as the timing selection signal for pit row in-between position selection, sampling and holding a value of the light reception signal in regard to the respective timings which represent the timing selection signals for pit row in-between position selection, and calculating a difference in the value which is sampled and held; and performing application of an offset using a saw-tooth wave with regard to a tracking servo loop performed based at least in part on the first and the second tracking error signal, switching alternately between the first tracking error signal and the second tracking error signal and inputting at a timing in accordance with a polarity reversion timing of the offset, and performing tracking servo control with regard to the object lens by controlling the tracking mechanism unit based at least in part on the input tracking error signal.

\* \* \* \* \*